United States Patent
Kim et al.

(10) Patent No.: US 9,939,461 B2
(45) Date of Patent: Apr. 10, 2018

(54) HEAD-INTEGRATED ATOMIC FORCE MICROSCOPE AND COMPOSITE MICROSCOPE INCLUDING SAME

(71) Applicant: KOREA RESEARCH INSTITUTE OF STANDARDS AND SCIENCE, Daejeon (KR)

(72) Inventors: Dal Hyun Kim, Daejeon (KR); Byong Chon Park, Daejeon (KR); Chae Ho Shin, Daejon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 15/323,078

(22) PCT Filed: Dec. 23, 2015

(86) PCT No.: PCT/KR2015/014143
§ 371 (c)(1),
(2) Date: Dec. 29, 2016

(87) PCT Pub. No.: WO2016/105109
PCT Pub. Date: Jun. 30, 2016

(65) Prior Publication Data
US 2017/0138983 A1    May 18, 2017

(30) Foreign Application Priority Data
Dec. 24, 2014  (KR) .................. 10-2014-0187700

(51) Int. Cl.
*G01Q 60/32* (2010.01)
(52) U.S. Cl.
CPC .................. *G01Q 60/32* (2013.01)
(58) Field of Classification Search
CPC ........ G01Q 20/00; G01Q 20/02; G01Q 60/18; G01Q 60/20; G01Q 60/22; G01Q 60/24;
(Continued)

(56) References Cited

U.S. PATENT DOCUMENTS

| 5,847,383 A | * | 12/1998 | Tong | B82Y 35/00 250/234 |
| 5,877,891 A | * | 3/1999 | Park | G01Q 20/02 250/311 |

(Continued)

FOREIGN PATENT DOCUMENTS

| KR | 1020110100052 A | 9/2011 |
| KR | 1020110100735 A | 9/2011 |

(Continued)

OTHER PUBLICATIONS

ISA Korean Intellectual Property Office, International Search Report Issued in Application No. PCT/KR2015/014143, Apr. 8, 2016, WIPO, 4 pages.

*Primary Examiner* — Jason McCormack
(74) *Attorney, Agent, or Firm* — McCoy Russell LLP

(57) ABSTRACT

An object of the application is to provide a head-integrated for an atomic force microscope capable of realizing minimization of a weight and a volume and improvement of structural stability by optimizing a head structure of the atomic force microscope. Another object of the application is to provide a head-integrated atomic force microscope capable of being utilized for imaging a large-area sample by enabling high-rate head scan due to dynamic characteristics improved by mounting the integrated-head described above. Still another object of the application is to provide a composite microscope including a head-integrated atomic force microscope, capable of performing high-rate position search and imaging and performing precise observation of a three-dimensional shape up to an atomic image level in a region of interest by combining the head-integrated atomic force microscope having the improved dynamic characteristics as described above and an electron microscope or an optical microscope with each other.

23 Claims, 9 Drawing Sheets

(A)

(B)

(58) Field of Classification Search
CPC ........ G01Q 60/32; G01Q 60/38; G01Q 70/00; G01Q 70/02; G01Q 70/08; G01Q 70/16
USPC ...... 850/5, 6, 30, 31, 32, 33, 37, 52, 53, 56, 850/60
See application file for complete search history.

(56) References Cited

U.S. PATENT DOCUMENTS

| | | | |
|---|---|---|---|
| 7,973,942 B2 | 7/2011 | Iyoki et al. | |
| 2003/0030810 A1* | 2/2003 | Sebok | G01N 15/147 356/436 |
| 2005/0117163 A1* | 6/2005 | Ng | G01Q 20/02 356/501 |
| 2007/0220958 A1* | 9/2007 | Gotthard | G01Q 20/02 73/105 |
| 2016/0187376 A1* | 6/2016 | Humphris | G01Q 70/02 850/18 |

FOREIGN PATENT DOCUMENTS

| | | |
|---|---|---|
| KR | 101158284 B1 | 6/2012 |
| WO | 03019238 A2 | 3/2003 |

\* cited by examiner (A)

(B)

(A)

(B)

(C)

Polyvinyl pyrrolidone salt crystal crystallized in the vicinity of nanoprism
Polyvinyl pyrrolidone salt crystal is dimly viewed in SEM scan rate 1 Hz / 7um x 7um    scan rate 1.8 Hz / 7um x 7um (A)

(B)

HEAD-INTEGRATED ATOMIC FORCE MICROSCOPE AND COMPOSITE MICROSCOPE INCLUDING SAME

CROSS-REFERENCE TO RELATED APPLICATIONS

The present application is a U.S. National Phase of International Patent Application Serial No. PCT/KR2015/014143, entitled "HEAD-INTEGRATED ATOMIC FORCE MICROSCOPE AND COMPOSITE MICROSCOPE INCLUDING SAME," filed on Dec. 23, 2015. International Patent Application Serial No. PCT/KR2015/014143 claims priority to Korean Patent Application No. 10-2014-0187700, filed on Dec. 24, 2014. The entire contents of each of the above-cited applications are hereby incorporated by reference in their entirety for all purposes.

TECHNICAL FIELD

The present invention relates to a head-integrated atomic force microscope and a composite microscope including the same, and more particularly, to a head-integrated atomic force microscope capable of having a high resolution and performing high-rate scan through miniaturization and lightness by forming an atomic force microscope (AFM) head using a three-dimensional integrated body, and a composite microscope including the same.

A scanning electron microscope (SEM), which is an electron microscope using a phenomenon that secondary electrons emitted from a surface of a solid are significantly changed depending on a shape of a surface of a sample or a kind of material, scans the surface of the sample with a finely focused primary electron beam to irradiate emission secondary electrons corresponding to a scan position onto a cathode-ray tube, thereby making it possible to enlarge and observe the shape of the surface. The SEM may be divided into detailed kinds of SEMs depending on kinds of electron guns generating electron beams. Among them, a field emission scanning electron microscope (FESEM) uses a field emission electron gun unlike a general SEM using a thermal emission electron gun, and may form very high electron beam brightness and a small intersection from a dot source to obtain a high resolution. An SEM technology has been first commercialized in 1965, and a structure and performance of the SEM technology have been improved up to now. Therefore, currently, the SEM technology has been actively used to observe a microstructure and a fine shape in a solid state over the entire industrial area.

An atomic force microscope (AFM) is a microscope capable of measuring a fine image up to an atomic image level using atomic force. When a micro probe approaches a surface of a sample in a nanometer level, force acts between atoms of the micro probe and the sample, and in the AFM, a probe is disposed at a tip of a cantilever, and when the cantilever is bent by the force between the atoms of the micro probe and the sample, deflection of reflected light on a surface of the cantilever is detected to measure the force between the atoms, thereby measuring an atomic image of the surface. This measuring method, which is an AFM measuring method, is called a beam bounce type which is most widely used. A scanning tunneling microscope (STM) measures a tunneling current sensitive to a distance between a sample and a probe using a conductor needle of which a tip is sharp. Since the STM uses the tunneling current, it may observe only a sample of an electrical conductor. However, the AFM may be used regardless of conductivity of a sample.

An optical microscope has magnification of at most several thousands, while the SEM has magnification of at most tens of thousands, such that it is appropriate for observing a microstructure, and the AFM has magnification of at most tens of millions, such that it may perform the most precise observation and obtain accurate three-dimensional shape information.

BACKGROUND ART

As described above, the SEM or the AFM has been widely used to observe the microstructure of the sample. As described above, the SEM has an advantage that it may perform high-rate scan, and the AFM has an advantage that it may perform three-dimensional observation up to the level much more precise than that of the SEM. Therefore, research and development for combining two types of microscopes with each other have been conducted. As a part of this research, there is a Korean Patent Registration No. 1158284 (entitled "Composite Measuring Apparatus") (hereinafter, referred to as "the related art"). In the related art, an atomic microscope measuring a surface of a sample substrate in an atomic level and a composite measuring apparatus of the atomic microscope and an electron microscope measuring the sample substrate have been disclosed. The composite measuring apparatus measures the surface of the sample substrate in an atomic level by the atomic microscope. However, unlike a general atomic force microscope, in the composite measuring apparatus, the sample is disposed perpendicularly to the ground, and a probe approaches the sample from a side surface. In addition, the composite measuring apparatus images a side surface of the atomic microscope and an end surface of the sample substrate by the electron microscope by allowing an electron beam to be incident to the surface of the sample substrate in parallel with the surface of the sample substrate. When the composite measuring apparatus is used, it is possible to observe an interaction between the probe of the atomic microscope and the surface of the sample substrate by the electron beam while observing the surface of the sample substrate by the atomic microscope. That is, when the composite measuring apparatus is used, a state in which the probe of the atomic microscope is worn or damaged may be monitored in real time by the electron microscope, and thus, a work for replacing the probe may be performed at a required time. Therefore, when it is observed that the probe is worn or damaged, a risk that an inaccurate result will be generated is removed in advance, thereby making it possible to improve accuracy and reliability of observation.

Meanwhile, unlike the related art, research for combining the advantage of the SEM that may perform the high-rate scan and the advantage of the AFM that may perform the precise observation with each other has been conducted. That is, it is possible to accurately and rapidly find a target position while observing the surface of the sample in real time by the SEM and perform more precise observation in the atomic image level by the AFM at the target position.

However, the following problems are present in realizing the combination of the SEM and the AFM as described above. As described above, an operation principle of the AFM is to allow the cantilever having the probe disposed at the tip thereof to approach a surface of an observation target object, measure a deformation degree of the cantilever by atomic force formed between the tip of the probe and the surface of the target object, and measure a shape of the surface of the target object on the basis of the deformation degree. When considering this operation principle, in the case in which noise such as external vibration is generated, undesired deformation of the cantilever is generated, such that there is a risk that reliability of an observation result will be decreased. However, since it is substantially difficult to completely exclude the generation of external vibration at the time of generation of mechanical movement, it is difficult to implement rapid movement of the AFM including the probe, and the like, for performing the high-rate scan.

Particularly, in the case of a beam bounce method of measuring movement of the probe using deflection of reflected light, which is most widely used among AFM atomic force measuring methods, separate components such as a plurality of mirrors, a position-sensitive photo-detector (PSPD), an optical fiber collimator, and the like, are required in addition to the cantilever including the probe, and these components should stably maintain fixed distances and positions with respect to the cantilever. However, in the case in which the external vibration that may not be disregarded is applied to the AFM as described above, distances and positions between the cantilever and these several other components may be finely changed, which may significantly decrease performance such as a resolution, a sensitivity, and the like, of the AFM and increase noise.

Furthermore, since several components should move together as described above, it is difficult to accurately adjust operations between actuators moving the respective components in the case of separately moving the respective components, the respective components may not rapidly move due to weights and volumes thereof in the structure according to the related art in the case of moving the respective components at a time, and the distances and the positions are easily changed or shaken in the case of rapidly moving the respective components, thereby causing bad dynamic characteristics such as large noise, or the like.

RELATED ART DOCUMENT

Patent Document

1. Korean Patent Registration No. 1158284 (entitled "Composite Measuring Apparatus")

DISCLOSURE

Technical Problem

Therefore, the present invention has been suggested in order to solve the problems of the related art as described above, and an object of the present invention is to provide an integrated-head for an atomic force microscope (AFM) capable of realizing minimization of a weight and a volume and improvement of structural stability by optimizing a head structure of the atomic force microscope. Another object of the present invention is to provide a head-integrated atomic force microscope capable of having improved dynamic characteristics by mounting the integrated-head described above. Still another object of the present invention is to provide a composite microscope including a head-integrated atomic force microscope, capable of imaging a large-area sample through high-rate head scan by combining the head-integrated atomic force microscope having the improved dynamic characteristics as described above and an electron microscope or an optical microscope with each other.

Technical Solution

In one general aspect, an integrated-head for an atomic force microscope includes: a measuring part 110 formed in a plate form in which it is extended from one side to the other side in a length direction, having a first mirror mount 111 and a second mirror mount 112 sequentially disposed therein to be spaced apart from each other from one side to the other side in the length direction and fixed thereto, having a tip mount 115 disposed therein to be spaced apart from the first mirror mount 111 in height and width directions and fixed thereto, and having an empty space formed below a tip 215, the first mirror mount 111 being provided with a first mirror 211, the second mirror mount 112 being provided with a second mirror 212, and the tip mount 115 being provided with the tip 215 including a probe disposed on a lower surface thereof and formed in a plate form in which it is extended in the length direction; a source part 120 formed in a block form in which it is connected to one side of the measuring part 110, having a penetrating path 125 formed in the length direction therein, and having a light source part 220 provided at a distal end of one side of the penetrating path 125 and fixed thereto; and a sensing part 130 formed in a block form in which it is connected to the other side of the measuring part 110, having an accommodating path 135 formed in the length direction therein, and having a position-sensitive photo detector (PSPD) 230 accommodated on the accommodating path 135 and fixed thereto, wherein the measuring part 110, the source part 120, and the sensing part 130 form a head frame formed of an integrated body.

An optical path P may be formed so that light passing through the penetrating path 125 from the light source part 220 is incident to the first mirror 211, light reflected on the first mirror 211 is incident to an upper surface of the tip 215, light reflected on the upper surface of the tip 215 is incident to the second mirror 212, and light reflected on the second mirror 212 is incident to and sensed in the PSPD 230.

In order to smoothly form the optical path as described above, the first mirror 211 and the second mirror 212 may be provided in a form in which they protrude in the width direction with respect to the first mirror mount 111 and the second mirror mount 112, respectively, and the respective reflection surfaces of the first mirror 211 and the second mirror 212 may be disposed to be directed toward a bottom, the penetrating path 125 and the accommodating path 135 may be formed to be inclined toward the measuring part 110 with respect to surfaces formed by the measuring part 110, respectively, and the reflection surface of the first mirror 211 may be disposed to be inclined toward the penetrating path 125 and the reflection surface of the second mirror 212 may be disposed to be inclined toward the accommodating path 135.

The first mirror mount 111 may include: a first mirror mount body part 111a formed in a plate form and disposed to surface-contact an upper surface of the measuring part 110; a first mirror mount mirror support part 111b formed at a distal end of one side of the first mirror mount body part 111a in the width direction and having the first mirror 211 disposed thereon; a first mirror mount fixing coupling hole 111c formed in a through-hole form at a central portion of the first mirror mount body part 111a; one pair of first mirror mount angle adjusting screw holes 111d formed in an internal thread form at corner portions of the first mirror mount body part 111a and disposed on a diagonal; and a first mirror mount bead groove 111e formed by drilling a surface of the first mirror mount body part 111a contacting the measuring part 110 using a drill so as not to penetrate through the first mirror mount body part 111a and formed at a point at which two extended lines extended from centers of the first mirror mount angle adjusting screw holes 111d toward the first mirror 211 in parallel with outlines of the first mirror mount body part 111a meet each other, one 110a of through-holes formed on the measuring part 110 and the first mirror mount fixing coupling hole 111c may be disposed to be in communication with each other, and a spring member penetrating through the through-hole 110a formed on the measuring part 110 and the first mirror mount fixing coupling hole 111c may be inserted into the through-hole 110a and the first mirror mount fixing coupling hole 111c to couple the first mirror mount 111 and the measuring part 110 to each other, a bead may be inserted into the first mirror mount bead groove 111e, such that a distance between the first mirror mount body part 111a and the measuring part 110 is constantly maintained by protrusion of the bead at a position of the first mirror mount bead groove 111e, and one pair of screw members may be inserted into the one pair of first mirror mount angle adjusting screw holes 111d, respectively, and an angle of the first mirror mount body part 111a with respect to the measuring part 110 may be adjusted depending on an insertion level of the one pair of screw members.

The second mirror mount 112 may include: a second mirror mount body part 112a formed in a plate form and disposed to surface-contact an upper surface of the measuring part 110; a second mirror mount mirror support part 112b formed at a distal end of one side of the second mirror mount body part 112a in the width direction and having the second mirror 212 disposed thereon; a second mirror mount fixing coupling hole 112c formed in a through-hole form at a central portion of the second mirror mount body part 112a; one pair of second mirror mount angle adjusting screw holes 112d formed in an internal thread form at corner portions of the second mirror mount body part 112a and disposed on a diagonal; and a second mirror mount bead groove 112e formed by drilling a surface of the second mirror mount body part 112a contacting the measuring part 110 using a drill so as not to penetrate through the second mirror mount body part 112a and formed at a point at which two extended lines extended from centers of the second mirror mount angle adjusting screw holes 112d toward the second mirror 212 in parallel with outlines of the second mirror mount body part 112a meet each other, one 110b of through-holes formed on the measuring part 110 and the second mirror mount fixing coupling hole 112c may be disposed to be in communication with each other, and a spring member penetrating through the through-hole 110b formed on the measuring part 110 and the second mirror mount fixing coupling hole 112c may be inserted into the through-hole 110b and the second mirror mount fixing coupling hole 112c to couple the second mirror mount 112 and the measuring part 110 to each other, a bead may be inserted into the second mirror mount bead groove 112e, such that a distance between the second mirror mount body part 112a and the measuring part 110 is constantly maintained by protrusion of the bead at a position of the second mirror mount bead groove 112e, and one pair of screw members may be inserted into the one pair of second mirror mount angle adjusting screw holes 112d, respectively, and an angle of the second mirror mount body part 112a with respect to the measuring part 110 may be adjusted depending on an insertion level of the one pair of screw members.

The tip mount 115 may include: a tip mount body part 115a formed in a plate form, fixed and coupled to a lower surface of the measuring part 110 so as to surface-contact the lower surface of the measuring part 110, and having a step part formed by protruding one side of a lower surface thereof in the length direction; a tip mount guide groove 115b formed on the step part of the tip mount body part 115a so as to be extended in the width direction; a tip mount press plate 115c formed in a thin plate form, a distal end of one side thereof in the length direction being inserted and disposed into the tip mount guide groove 115b; a tip mount fixing coupling hole 115d formed in an internal thread form at a central portion of the tip mount body part 115a; one pair of tip mount guide coupling holes 115e formed in a through-hole form at both sides of the tip mount fixing coupling hole 115d in the width direction on the tip mount body part 115a so as to be spaced apart from each other; a PZT 115f provided on an upper surface of one side of the tip mount body part 115a in the length direction and vibrating the tip; a lower insulator plate 115g stacked on a lower surface of the PZT 115f; and an upper insulator plate 115h stacked on an upper surface of the PZT 115f, the tip 215 may be interposed between the tip mount body part 115a and the tip mount press plate 115c at a distal end of the other side of the tip mount 115 in the length direction and be pressed by the tip mount press plate 115c to thereby be supported by and fixed to the tip mount body part 115a, the tip mount 115 may be fixed and coupled to the lower surface of the measuring part 110 by a PZT laminate formed by stacking the upper insulator plate 115h, the PZT 115f, and the lower insulator plate 115g, grooves may be formed at positions corresponding to the tip mount fixing coupling hole 115d and the tip mount guide coupling holes 115e on the tip mount press plate 115c, one of the grooves formed on the tip mount press plate 115c and the tip mount fixing coupling hole 115d may be disposed to be in communication with each other, and a screw member penetrating through the groove formed on the tip mount press plate 115c and the tip mount fixing coupling hole 115d may be inserted into the groove and the tip mount fixing coupling hole 115d to couple the tip mount body part 115a and the tip mount press plate 115c to each other, and the other grooves formed on the tip mount press plate 115c and the tip mount guide coupling holes 115e may be disposed to be in communication with each other, screw members penetrating through the grooves formed on the tip mount press plate 115c and the tip mount guide coupling holes 115e may be inserted into the grooves and the tip mount guide coupling holes 115e, and a regular position of the tip mount press plate 115c in the width direction may be fixed by coupling of one pair of screw members.

The head frame is manufactured by a process of cutting all portions except for portions supporting and fixing a framework having a thickness and a width required for preventing mechanical vibration and head components including the first mirror mount 111, the second mirror mount 112, the tip mount 115, the light source part 220, and the PSPD 230 in a single block formed of a metal having a density in a range of 2 to 5 g/cm$^3$ and additionally cutting the single block so that the head frame itself functions as portions of the mounts of the head components in order to decrease a weight and a volume. When viewing drawings (FIGS. 3 and 4) provided as an embodiment, the head frame functions as portions of the two mirror mounts and a mount of the light source part.

The first mirror 211 and the second mirror 211 may be formed at a thickness that is in a range of 2 to 3 mm, and the first mirror mount 111, the second mirror mount 112, and the tip mount 115 may be formed at a thickness that is in a range of 0.5 to 1.5 mm.

A ratio between a size of the integrated-head 100 for an atomic force microscope in the width direction or the height direction and a size thereof in the length direction may be in a range of 1:5 to 1:15 and the integrated-head 100 may be formed to be elongated in only the length direction and is formed to be as short as possible in the width and height directions.

In order to minimize a height of the integrated-head 100 for an AFM at a position of the probe of the tip 215 to minimize a working distance of an auxiliary microscope provided above the integrated-head 100 for an atomic force microscope, an optical path P may be formed so that an incident angle of light from the source part 120 to the measuring part 110 and a reflection angle of light from the measuring part 110 to the sensing part 130 are acute angles or the first mirror 211 and the second mirror 211 may be formed at a thickness that is in a range of 2 to 3 mm, and the first mirror mount 111, the second mirror mount 112, and the tip mount 115 may be formed at a thickness that is in a range of 0.5 to 1.5 mm.

Both of portions above the first mirror 211 and the second mirror 222 and opposite portions of the first mirror mount 111 and the second mirror mount 112 may be empty to prevent in an increase in a working distance of an auxiliary microscope positioned above the integrated-head 100 in the case in which the integrated-head 100 is pivoted around the length direction.

In one detailed embodiment of the source part 120, the light source part 220 may be formed of a collimator collecting and irradiating light input from an external light source or a laser diode corresponding to a self light-emitting source, and a lens 225 may be further provided on the penetrating path 125.

In another detailed embodiment of the source part 120, the light source part 220 may be formed of a laser fiber focuser configured to include an optical fiber receiving laser light, a holder holding a distal end of the optical fiber, a laser focusing lens focusing the light transmitted from the optical fiber, and a fixing mount fixing the optical fiber, and the holder, and the laser focusing lens integrally with each other.

In another general aspect, a head-integrated atomic force microscope includes the integrated-head 100 for an atomic force microscope configured as described above, wherein the head-integrated atomic force microscope is fixed by a sample mount 500 and observes a surface of an observation target object disposed below the integrated-head 100.

The head-integrated atomic force microscope may further include a scanning means 300 scanning the integrated-head 100 or the sample mount 500 in X, Y, and Z directions, wherein the scanning means 300 is formed of a scanner for an atomic force microscope or a nanostage. In the case, as the scanner for an AFM, all of various types of scanners for an AFM such as a single tube scanner or a plurality of tube scanners, a rod scanner, a stacked PZT scanner, or the like, may be used. The head-integrated atomic force microscope may further include a positioning stage 400 moving the integrated-head 100 or the sample mount 500 in the X, Y, and Z direction and formed to move the integrated-head 100 or the sample mount 500 in a scale relatively larger as compared with the scanning means 300.

The head-integrated atomic force microscope may further include: a ring fixing part 310 formed in a ring shape and connecting and fixing a target object including the integrated-head 100 to one side thereof; and three pillar parts 320 radially disposed on a circumference of the ring fixing part 310 and fixing the ring fixing part 310 in a state in which they space the ring fixing part 310 apart from a substrate part 450. The scanning means 300 scanning the integrated-head 100 may be fixed to an intermediate position of two of the pillar parts 320. The head-integrated atomic force microscope may further include an ascending or descending means 325 provided in at least any one selected among the pillar parts 320 so as to allow the probe of the tip 215 to approach the surface of the observation target object or be spaced apart from the surface of the observation target object up to a distance at which the probe is fed back.

In still another general aspect, a composite microscope including a head-integrated atomic force microscope includes: the integrated-head 100 for an atomic force microscope configured as described above; and an auxiliary microscope part disposed above the integrated-head 100, fixed by a sample mount 500, and observing a surface of an observation target object disposed below the integrated-head 100. The auxiliary microscope part may be formed in a form of a charged particle microscope including a scanning electron microscope (SEM) or an ion microscope or be formed in a form of an optical microscope.

The composite microscope including a head-integrated atomic force microscope may further include a scanning means 300 scanning the integrated-head 100 or the sample mount 500 in X, Y, and Z directions, wherein the scanning means 300 is formed of a scanner for an atomic force microscope or a nanostage. In the case, as the scanner for an AFM, all of various types of scanners for an AFM such as a single tube scanner or a plurality of tube scanners, a rod scanner, a stacked PZT scanner, or the like, may be used. The composite microscope including a head-integrated atomic force microscope may further include a positioning stage 400 moving the integrated-head 100 or the sample mount 500 in the X, Y, and Z direction and formed to move the integrated-head 100 or the sample mount 500 in a scale relatively larger as compared with the scanning means 300.

The composite microscope including a head-integrated atomic force microscope may further include: a ring fixing part 310 formed in a ring shape and connecting and fixing a target object including the integrated-head 100 to one side thereof; and three pillar parts 320 radially disposed on a circumference of the ring fixing part 310 and fixing the ring fixing part 310 in a state in which they space the ring fixing part 310 apart from a substrate part 450. The scanning means 300 scanning the integrated-head 100 may be fixed to an intermediate position of two of the pillar parts 320. The composite microscope including a head-integrated atomic force microscope may further include an ascending or descending means 325 provided in at least any one selected among the pillar parts 320 so as to allow the probe of the tip 215 to approach the surface of the observation target object or be spaced apart from the surface of the observation target object up to a distance at which the probe is fed back.

Advantageous Effects

In the present invention, the integrated-head for an AFM in which layouts and structures of components (hereinafter, referred to as 'components for observation') approaching a surface of an observation target object to actually perform observation in the atomic force microscope (AFM) are optimized is suggested. Therefore, according to the present invention, a head for an AFM of which a weight and a volume are significantly decreased and structural stability is improved as compared with an existing AFM may be realized. In addition, the integrated-head for an AFM according to the present invention is configured in a form in which the components for observation are optimally disposed in an integrated body, such that the components for observation may not be easily misaligned and shaken due to internal or external vibration, high-rate head scan, or the like, unlike, an existing atomic force microscope. Further, the integrated-head for an AFM according to the present invention has a small volume and weight, such that it may be used in a narrow space, and a decrease in a resonant frequency of a scanner or a nanostage serving as the scanner is slight, such that the integrated-head for an AFM according to the present invention may perform high-rate head scan.

In addition, according to the present invention, the structural stability of the head itself for an AFM is secured as described above, such that dynamic characteristics of an atomic force microscope in which the integrated-head for an AFM described above is mounted are significantly improved. That is, deterioration of performance of the head-integrated atomic force microscope according to the present invention due to internal or external vibration, impact, or the like, is decreased, such that the head-integrated atomic force microscope has performance significantly more excellent than that of an existing AFM. In detail, the existing AFM has bad structural stability and dynamic characteristics, such that a high-rate scan operation may not be applied to the head for an AFM. However, according to the present invention, the high-rate head scan may be implemented through improvement of the structural stability and the dynamic characteristics in the head for an AFM head as described above. Therefore, the integrated-head for an AFM is scanned at a high rate, thereby making it possible to rapidly image a large and heavy sample or a large-area sample.

Due to the effects described above, according to the present invention, a composite effect of the head-integrated atomic force microscope of which the dynamic characteristics are improved as described and a charged particle microscope such as an electron microscope or an optical microscope may be maximized. As described above, when an optical microscope or an electron microscope that may perform high-rate imaging of the large-area sample and the head-integrated atomic force microscope according to the present invention that may perform the high-rate head scan are combined with each other, the large-area sample as well as a small sample may be rapidly three-dimensionally AFM-imaged, such that an effect of the composite microscope may be maximized. Ultimately, the composite microscope including the head-integrated atomic force microscope according to the present invention may not only perform the high-rate scan, but also perform precise observation of a three-dimensional shape up to an atomic image level in a region of interest, thereby making it possible to maximize all of efficiency, accuracy, and reliability in micro observation.

Figure 11:
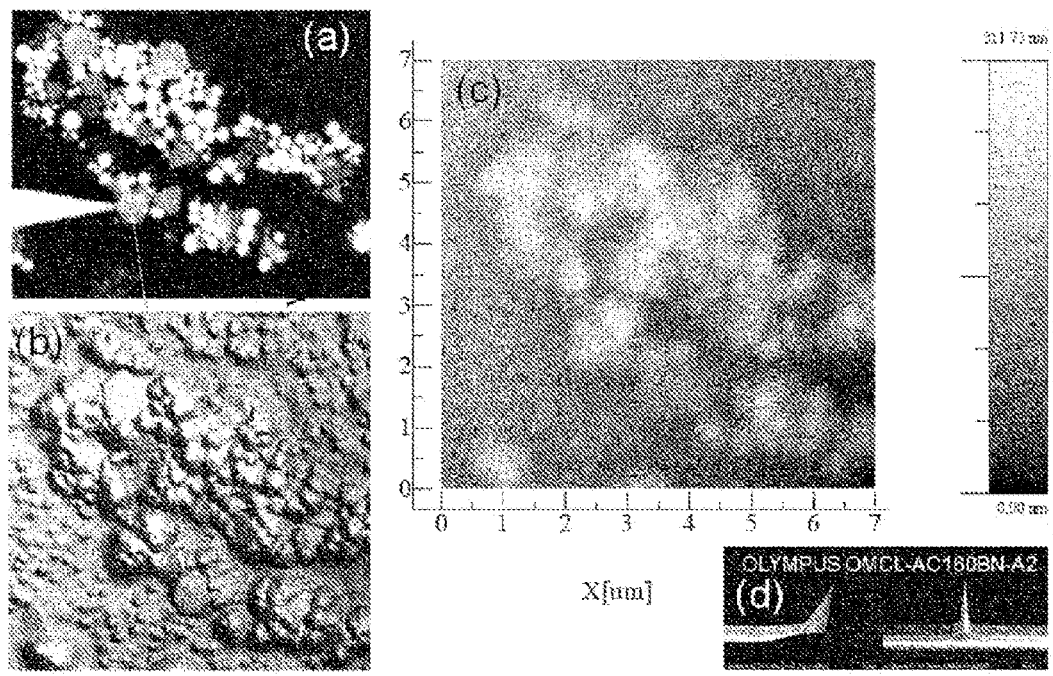
FIGS. 11 to 14 are views illustrating experiment results obtained by actually performing observation using the AFM-SEM composite microscope according to the present invention manufactured as described above.
Figure 12:
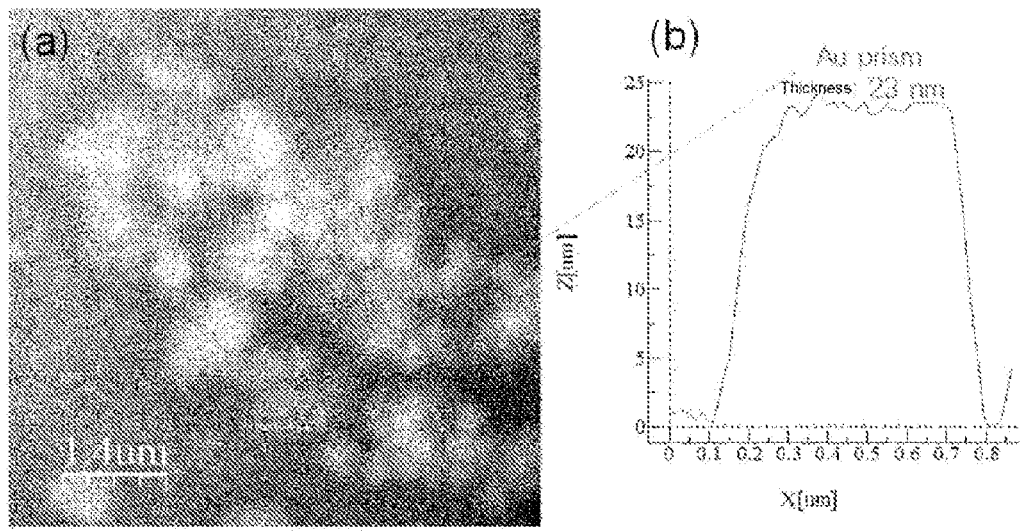

In more detail,

FIGS. 11 and 12 are composite microscope images of a sample scan-type AFM scanning a sample.

FIG. 11A is an SEM image, FIG. 11B is a three-dimensional AFM image, FIG. 11C is a two-dimensional AFM image, and FIG. 11D is an SEM image of a tip for an AFM.

FIG. 12A is an AFM image, and FIG. 12B is a line profile of a lower line of the image of FIG. 12A and may accurately recognize a height of a gold nanoprism.

Figure 13:
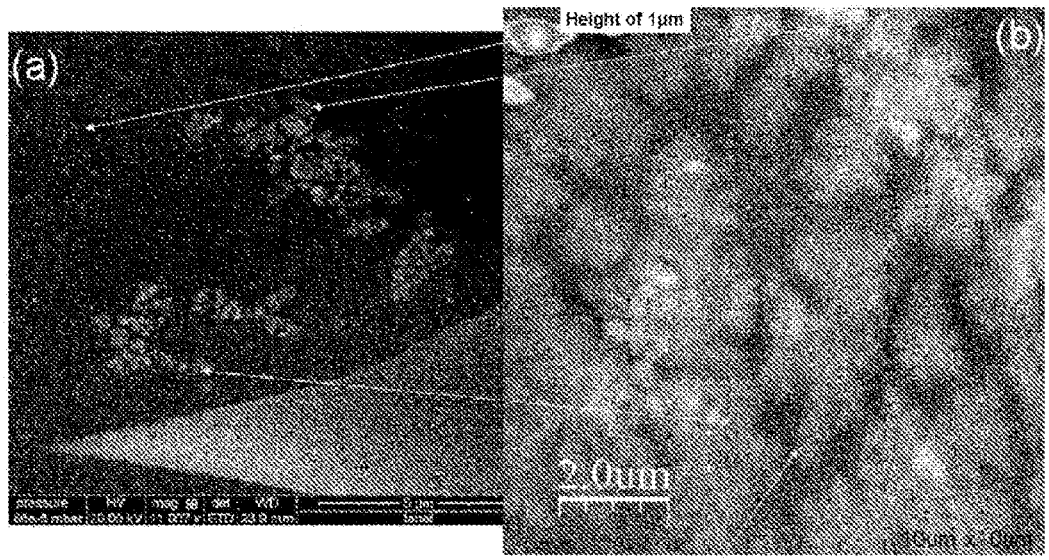
Figure 14:
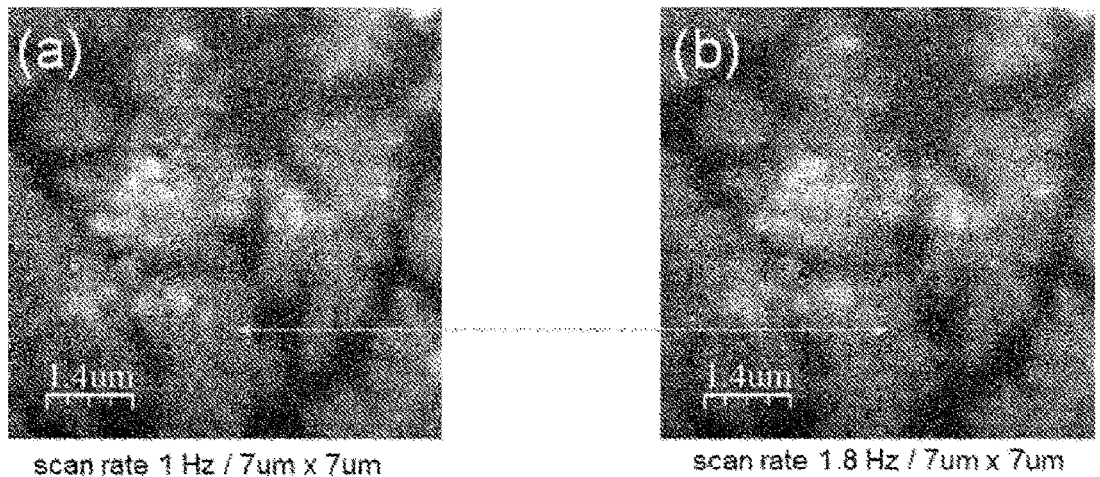

FIGS. 13 and 14 are composite microscope images of a head scan-type AFM scanning a head.

FIG. 13A is an SEM image, and FIG. 13B is an AFM image. Positions of both ends of an arrow are the same positions.

FIG. 14A is an AFM image in the case in which a time required for scanning one line is 1 second, and FIG. 14B is an AFM image in the case in which a time required for scanning one line is 1/1.8 second (becomes faster than 1 second by 80%).

[Detailed Description of Main Elements]

100: integrated-head for atomic force microscope (according to the present invention)
110: measuring part
110a, 110b: through-hole (for coupling between mirror mounts 111 and 112 and measuring part 110)
111: first mirror mount

| 111a: first mirror mount body part | 111b: first mirror mount mirror support part |
| --- | --- |
| 111c: first mirror mount fixing coupling hole | 111d: first mirror mount angle adjusting screw hole |
| 111e: first mirror mount bead groove | |
| 112: second mirror mount | |
| 112a: second mirror mount body part | 112b: second mirror mount mirror support part |
| 112c: second mirror mount fixing coupling hole | 112d: second mirror mount angle adjusting screw hole |
| 112e: second mirror mount bead groove | |
| 115: tip mount | 115a: tip mount body part |
| 115b: tip mount guide groove | 115c: tip mount press plate |
| 115d: tip mount fixing coupling hole | 115e: tip mount guide coupling hole |
| 115f: PZT | |
| 115g: upper insulator plate | 115h: lower insulator plate |
| 120: source part | 125: penetrating path |
| 130: sensing part | 135: accommodating path |
| P: (laser) optical path | |
| 211: first mirror | 212: second mirror |
| 215: tip | 220: light source part |
| 225: lens | 230: PSPD |

[Detailed Description of Main Elements]

300: scanning means
320: pillar part
400: positioning stage
500: sample mount
310: ring fixing part
325: ascending or descending means
450: substrate part

BEST MODE

Hereinafter, a head-integrated atomic force microscope having the configuration as described above and a composite microscope including the same according to the present invention will be described in detail with reference to the accompanying drawings.

Figure 1:
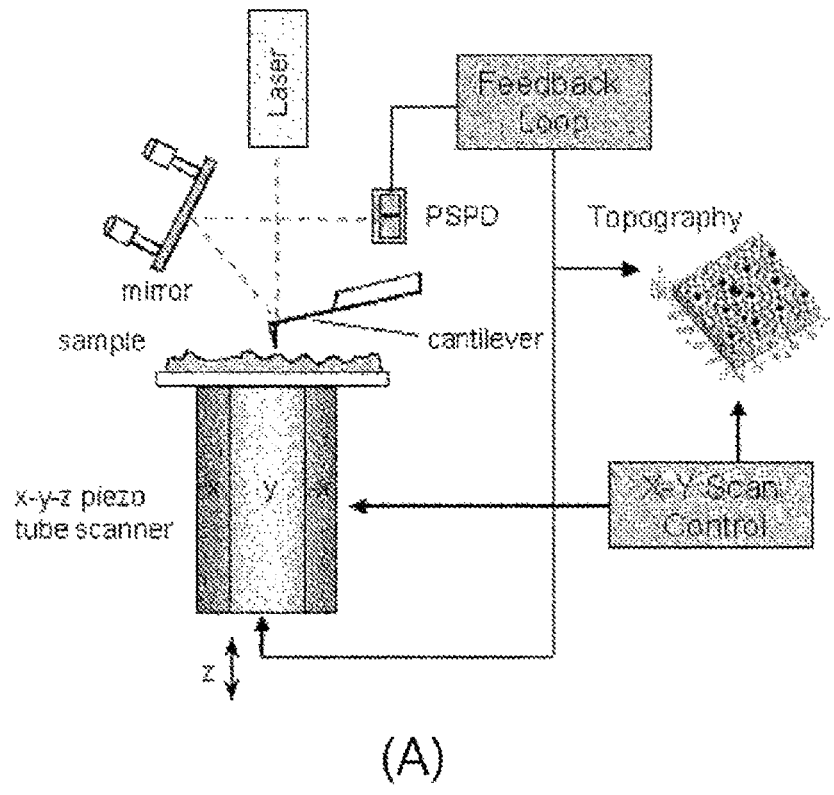
FIG. 1 is a view illustrating a principle of an atomic force microscope (AFM).
Figure 1:
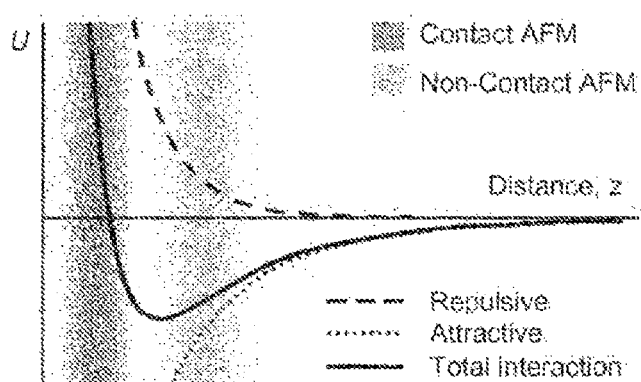

First, a basic configuration of an atomic force microscope (AFM) will be described in detail. FIG. 1 illustrates a principle of an AFM. As illustrated in a schematic configuration diagram of FIG. 1A, a cantilever including a probe disposed at a tip thereof is disposed in the vicinity of a sample, and the probe is disposed to be very close to a surface of the sample in a nanometer level. In addition, a laser light is irradiated to an opposite surface of the cantilever to a surface of the cantilever on which the probe is provided. This light is reflected by a mirror and is incident to and is observed in a position-sensitive photo-detector (PSPD). FIG. 1B is a graph illustrating a change in atomic force U depending on a distance z between the probe and the sample. When the distance between the probe and the sample is changed in accordance with a change in a height of the surface of the sample, the atomic force is also changed. The change in the atomic force described above causes deformation of the cantilever, and the deformation of the cantilever also causes a change in a position at which the laser light irradiated to the tip of the cantilever is reflected and is incident to the PSPD. That is, ultimately, when a Z axis of a nanostage is extended or shortened so that a position change value of the light measured in the PSPD becomes constant and feedback is performed, a height change value of the surface of the sample may be calculated.

Recently, a non-contact atomic force microscope has been mainly used in order to prevent damage of the probe itself or the surface of the sample. The non-contact atomic force microscope applies a predetermined vibration signal to the cantilever or the sample, and finally calculates the height change value of the surface of the sample using a change in a resonant frequency of the cantilever generated depending on the deformation of the cantilever by the atomic force. Since a principle of calculating the height change value of the surface of the sample from an actually measured value has been widely known in documents related to a general atomic force microscope, a description therefor will be omitted.

As seen in FIG. 1, components such as the cantilever including the probe, a light source (a laser in an example of FIG. 1A) generating an optical signal, optical components (the mirror and a lens in the example of FIG. 1A) appropriately changing an optical path, the PSPD measuring the position at which the light is incident, and the like, are required in order to actually realize observation in the AFM. These components are separately provided in an existing AFM. That is, for example, an observing part including the cantilever, a driving part applying a vibration signal, and the like, an optical part configured by combining the light source, the optical components, and the like, with each other, a measuring part including the PSPD, and the like, are separately manufactured. The observing part, the optical part, the measuring part, and the like, (hereinafter, referred to as "components for observation") formed of separate assemblies as described above are fixedly provided on an apparatus base.

Figure 2:
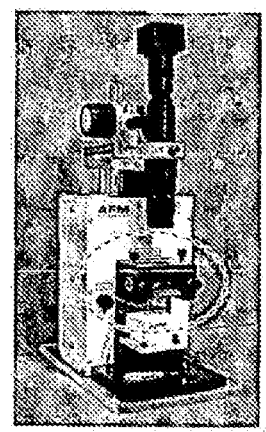
FIG. 2 is a view illustrating various AFMs according to the related art.
Figure 2:
Figure 2:
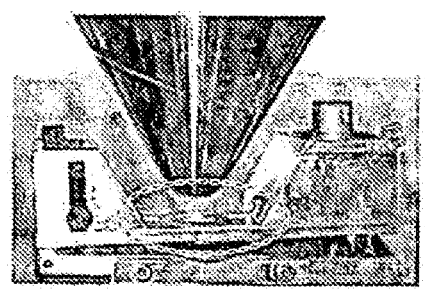

In addition, since the AFM itself is to observe an atomic image, it has been premised that an area of the sample itself, which is an observation target object, is relatively significantly small. Therefore, an area that may be observed by the observing part has been limited to a very small range. FIG. 2 is actual photographs of various AFMs according to the related art. As illustrated by a dotted oval in FIG. 2, it may be confirmed that a stage part on which an observation target sample is put has a very small area.

As described above, in the related art, the AFM has been designed in a state in which it is assumed that the area itself of the observation target is basically very small. Therefore, in the related art, the respective parts themselves of the AFM have been separately manufactured, have been manufactured in a state in which they are stably fixed, and have been manufactured without being limited in weights and volumes of the respective parts.

However, in the related art, as seen in an illustrative view of FIG. 2, the stage itself on which the observation target object by the AFM is put had a very small area, such that it was difficult to observe a large-area target object by the AFM. However, as a use field of a semiconductor technology is widely increased and an application product of the semiconductor technology is diversified in accordance with the development of the semiconductor technology, the necessity to observe a microstructure on a surface of a large-area target object such as a semiconductor wafer, or the like, has increased, and it was basically difficult to solve this demand by the AFM according to the related art due to the reason as described above.

Therefore, it has been demanded to combine advantages of a scanning electron microscope (SEM) that may observe a relatively large-area target object and the AFM that may accomplish the most precise observation in an atomic image level with each other. However, since the components for observation basically have significant weights and volumes and are manufactured in a fixed form in the AFM according to the related art as described above, it was impossible to perform observation while moving the components for observation on the large-area observation target object.

The present invention suggests a form in which the components for observation become light and are miniaturized, and are integrated with each other in order to solve this problem. Hereinafter, detailed configurations of an integrated-head for an AFM according to the present invention, an AFM including the integrated-head, and a composite microscope in which the AFM and an SEM are combined with each other will be described.

Figure 3:
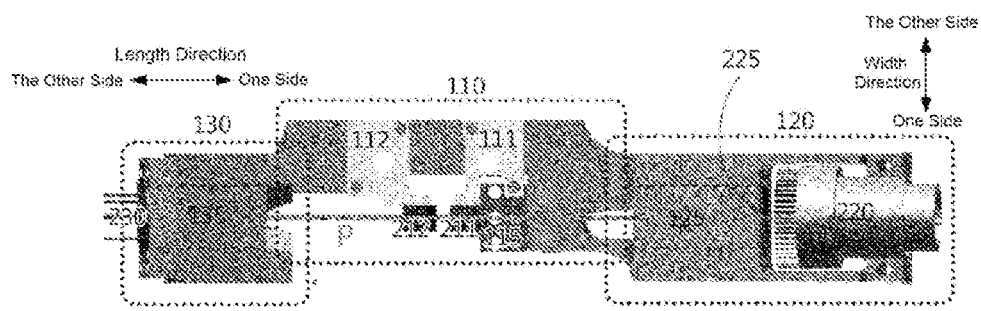
FIG. 3 is a view illustrating an embodiment of an integrated-head for an AFM according to the present invention.
Figure 3:
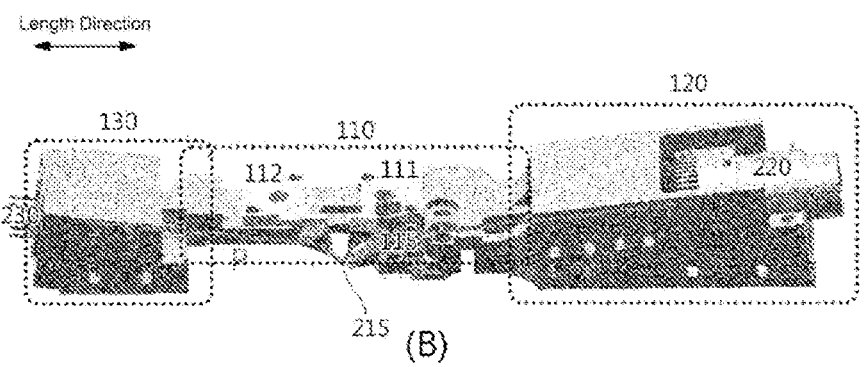
Figure 3:
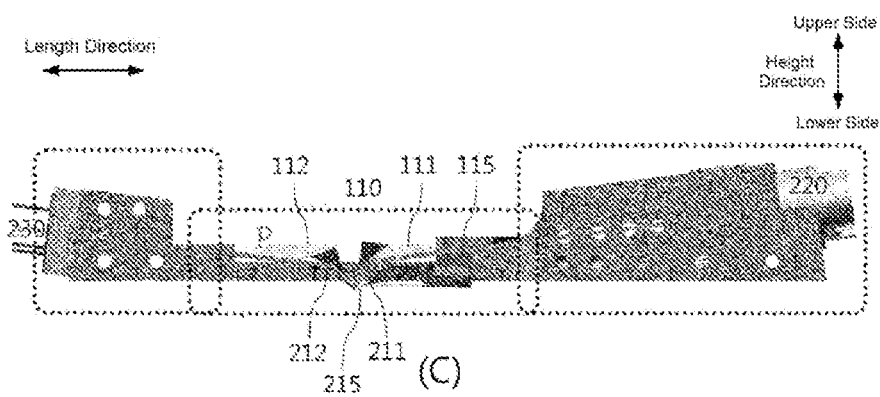
Figure 4:
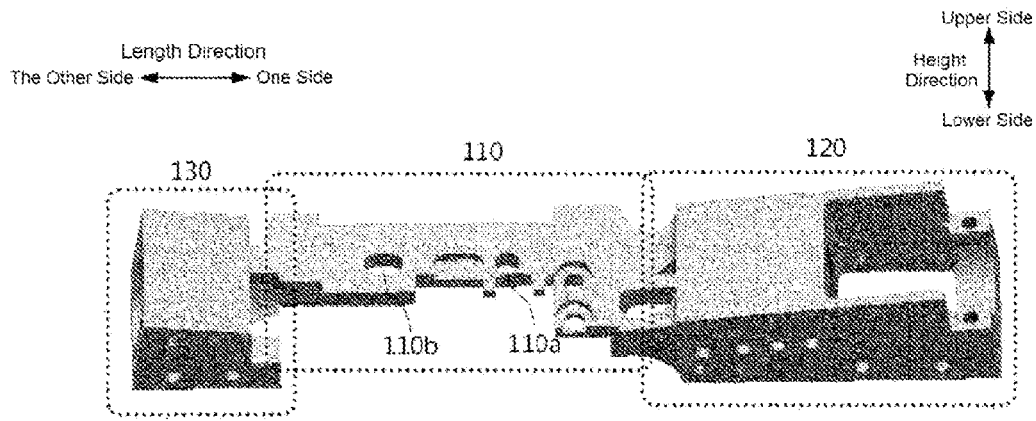
FIG. 4 is a view illustrating an embodiment of a head frame according to the present invention.

FIG. 3 is a view illustrating an embodiment of an integrated-head for an AFM according to the present invention, and FIG. 4 is a view illustrating an embodiment of a head frame according to the present invention. As illustrated, the integrated-head 100 for an AFM according to the present invention (hereinafter, simply referred to as an 'integrated-head') includes components for observation in the AFM fixedly provided on each of a measuring part 110, a source part 120, and a sensing part 130, and is configured so that the measuring part 110, the source part 120, and the sensing part 130 form a head frame formed of an integrated body.

The measuring part 110 is a part fixing components including a tip 215, which is a component performing measurement of an observation target object in the AFM. In this case, a first mirror 211 and a second mirror 212 that should be disposed closely to the tip 215 in order to form an optical path, in addition to the tip 215, are also fixed to the measuring part 110. Here, first, the tip 215 includes a probe disposed on a lower surface thereof, is formed in a plate form in which it is extended in a length direction, and is provided on a tip mount 115, the first mirror 211 is provided on a first mirror mount 111, and the second mirror 212 is provided on a second mirror mount 112.

The measuring part 110 is basically formed in a plate form in which it is extended from one side to the other side in the length direction, as illustrated. The first mirror mount 111 and the second mirror mount 112 are sequentially disposed to be spaced apart from each other from one side to the other side in the length direction and are fixed to the measuring part. In addition, the tip mount 115 is disposed to be spaced apart from the first mirror mount 111 in height and width directions and are fixed to the measuring part. In this case, an empty space is formed below the tip 215, such that the probe formed on the lower surface of the tip 215 may directly face the observation target object.

The source part 120 is a part fixing components irradiating light used to measure the observation target object in the AFM. Light for measurement is supplied in a collimated light form that is easily sensed by a light source part 220. The source part 120 is basically formed in a block form in which it is connected to one side of the measuring part 110, as illustrated. In addition, in the source part 120, a penetrating path 125 (penetrating through a body of the source part 120 having the block form) is formed in the length direction, and the light source part 220 is provided at a distal end of one side of the penetrating path 125 and is fixed to the source part 120. Therefore, the collimated light irradiated from the light source part 220 may move along the penetrating path 125.

In this case, in an embodiment of the source part 120, the light source part 220 may be formed of a collimator collecting and irradiating light input from an external light source or a laser diode, which is a self light-emitting source. In the case in which the light source part 220 is formed of the collimator, the light source part 220 serves to introduce light of the separate external light source into a head, and in the case in which the light source part 220 is formed of the laser diode emitting light in itself, the separate external light source is not required. In addition, in this case, a lens 225 is further provided on the penetrating path 125. The lens 225 is disposed on a moving path of the collimated light to serve to adjust the collimated light to be focused on a surface of the tip.

Alternatively, in another embodiment of the source part 120, the light source part 220 may also be formed of a laser fiber focuser. The laser fiber focuser is an apparatus configured to include an optical fiber receiving laser light, a holder holding a distal end of the optical fiber, a laser focusing lens focusing the light transmitted from the optical fiber, and a fixing mount fixing the optical fiber, and the holder, and the laser focusing lens integrally with each other to supply the laser light. In the case in which the laser fiber focuser is used as the light source part 220, the laser fiber focuser has the same form as a form in which the collimator or the laser diode, the lens, and the like, are configured integrally with each other in the embodiment of the source part described above. Therefore, the laser fiber focuser may be significantly easily installed, and a weight and a volume of the laser fiber focuser may be significantly decreased.

Figure 15:
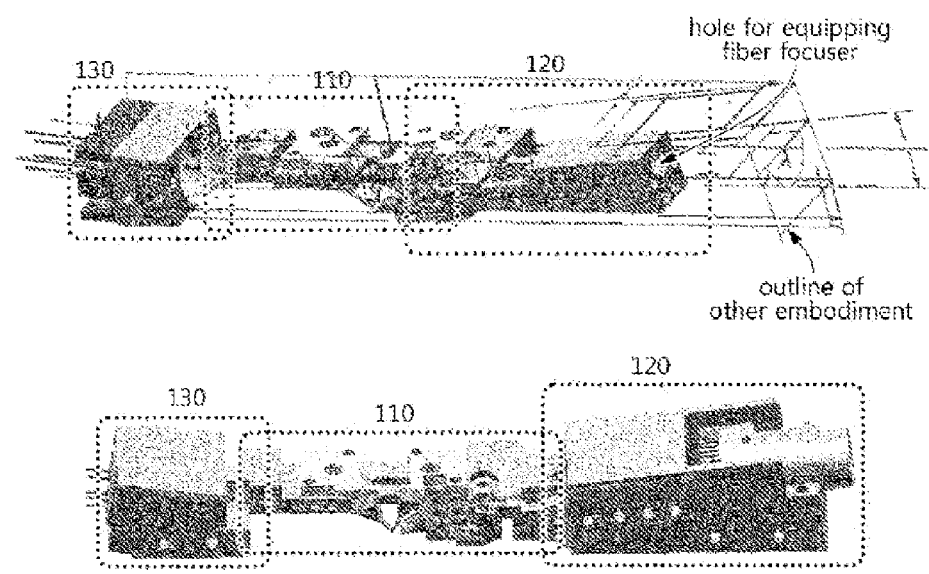
FIG. 15 is a view illustrating an embodiment of a case in which a light source part is formed of a laser fiber focuser.
Figure 15:
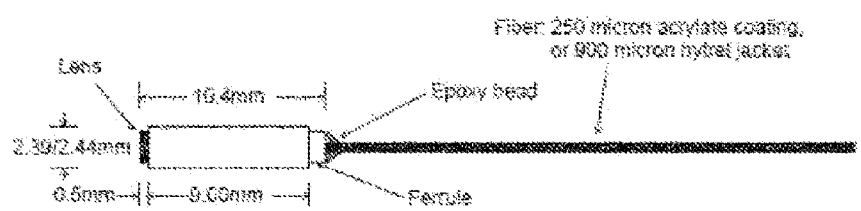

FIG. 3 illustrates an embodiment of the integrated-head in the case in which the light source part is formed of the collimator and the lens is provided on the penetrating path. To the contrary, FIG. 15 illustrates an embodiment in the case in which the light source part is formed of the laser fiber focuser. An upper drawing of FIG. 15A illustrates a case in which the light source part is formed of the laser fiber focuser, and a lower drawing of FIG. 15A is the same drawing as FIG. 3B. In addition, FIG. 15B illustrates an example of a commercialized laser fiber focuser product. It may be intuitively seen from FIG. 15B that the collimator and the lens are replaced by the laser fiber focuser, such that a weight and a volume may be significantly decreased.

Furthermore, as intuitively seen by comparing the upper and lower drawings of FIG. 15A with each other, in the case in which the light source part is formed of the laser fiber focuser, a volume of a block of the source part 120 of the integrated-head may be significantly decreased, as denoted by an 'outline of other embodiment' in the upper drawing of the FIG. 15A. Therefore, weights of the integrated-head and all of accessories belonging to the integrated-head may be decreased. It has been actually confirmed as a result of manufacturing a pilot product that the pilot product may be manufactured at a weight lighter by about 10 g in the case in which the light source part is formed of the laser fiber focuser than in the case in which the light source part is formed of the collimator and the lens.

The sensing part 130 is a part fixing a component sensing the light used to measure the observation target object in the AFM. Here, first, a position-sensitive photo-detector (PSPD) is used to sense this light. The PSPD is an apparatus that may measure a position at which the light is incident when the light is incident to a surface on which the light may be sensed.

The sensing part 130 is basically formed in a block form in which it is connected to the other side of the measuring part 110, as illustrated. In addition, in the sensing part 130, an accommodating path 135 (penetrating through a body of the sensing part 130 having the block form) is formed in the length direction, and the PSPD 230 is accommodated on the accommodating path 135 and is fixed to the sensing part. Therefore, the light moving through the accommodating path 135 may be smoothly incident to and sensed in the PSPD 230.

In the integrated-head 100 configured as described above, as illustrated in FIG. 3, the light moves from one side of the integrated-head 100 to the other side thereof in the length direction, which will be described below in more detail. That is, in the integrated-head 100, an optical path P is formed so that the light passing through the penetrating path 125 from the light source part 220 is incident to the first mirror 211, light reflected on the first mirror 211 is incident to an upper surface of the tip 215, light reflected on the upper surface of the tip 215 is incident to the second mirror 212, and light reflected on the second mirror 212 is incident to and sensed in the PSPD 230.

In this case, in order for the optical path P to be accurately formed to allow the light to smoothly move, it is preferable that the respective parts in the integrated-head 100 are disposed as follows.

That is, in the integrated-head 100, first, the first mirror 211 and the second mirror 212 are provided in a form in which they protrude in the width direction with respect to the first mirror mount 111 and the second mirror mount 112, respectively, and the respective reflection surfaces of the first mirror 211 and the second mirror 212 are disposed to be directed toward the bottom. That is, the reflection surfaces of the first mirror 211 and the second mirror 212 are disposed above the tip 215 and are disposed to be directed toward the tip 215 in order to allow the light to be smoothly incident to the upper surface of the tip 215 or smoothly receive the light reflected from the upper surface of the tip 215.

In addition, it is preferable that the penetrating path 125 and the accommodating path 135 are formed to be inclined toward the measuring part 110 with respect to surfaces formed by the measuring part 110, respectively. That is, since the measuring part 110 is formed between the penetrating path 125 and the accommodating path 135 as illustrated, the penetrating path 125 and the accommodating path 135 are formed in a form in which extended lines thereof are collected in the vicinity of the measuring part 110 therebetween. Although the penetrating path 125 and the accommodating path 135 are not necessarily formed to be inclined, when the light moves along the optical path P as described above, the penetrating path 125 and the accommodating path 135 are formed to be inclined, thereby making it possible to decrease an entire length of the optical path P and volumes (particularly in the length direction) of spaces formed by them. Furthermore, a distance between a tip of the probe causing atomic force with a sample and upper portions of the two mirrors, which are the top of the integrated-head 100 of an upper portion of the tip, is decreased within 6 mm (that is, a volume in the height direction is decreased) to decrease a working distance of an auxiliary microscope of the composite microscope, such as the SEM, thereby making it possible to perform high-resolution imaging of the auxiliary microscope.

In addition, in order to accurately form the optical path P, the reflection surface of the first mirror 211 is disposed to be inclined toward the penetrating path 125 and the reflection surface of the second mirror 212 is disposed to be inclined toward the accommodating path 135. Inclined angles of the first mirror 211 and the second mirror 212 are basically determined when the respective mirrors 211 and 212 are attached onto the respective mirror mounts 111 and 112. In this case, a means that may adjust the angles of the respective mirrors 211 and 212 may be further provided. However, it is preferable that the respective mirrors 211 and 212 are fixedly provided on the respective mirror mounts 111 and 112 at predetermined angles for the purpose of structural stability.

Hereinafter, structures of detailed embodiments of the respective mirror mounts 111 and 112 fixing the respective mirrors 212 and 212 onto the measuring part 110 and the tip mount 115 fixing the tip 215 onto the measuring part 110 as described above will be described.

Figure 5:
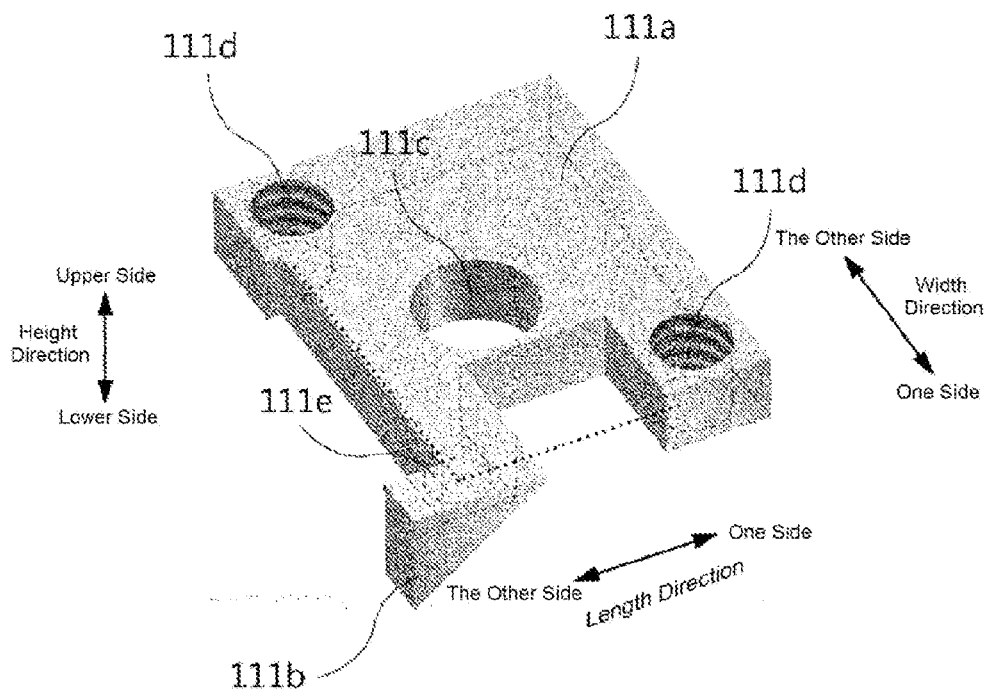
FIG. 5 is a view illustrating an embodiment of a mirror mount according to the present invention.

FIG. 5 illustrates an embodiment of a mirror mount according to the present invention. FIG. 5 illustrates the first mirror mount 111. As illustrated in FIG. 5, the first mirror mount 111 is configured to include a first mirror mount body part 111a, a first mirror mount mirror support part 111b, a first mirror mount fixing coupling hole 111c, first mirror mount angle adjusting screw holes 111d, and a first mirror mount bead groove 111e.

The first mirror mount body part 111a is formed in a plate form as illustrated in FIG. 5, and is disposed to surface-contact an upper surface of the measuring part 110 as illustrated in FIG. 3. In this case, the first mirror mount body part 111a fixing the first mirror 211 becomes a moving part of a general mirror mount, such that it is disposed to be spaced apart from the upper surface of the measuring part 110 acting as a fixed part of the general mirror mount.

The first mirror mount mirror support part 111b is formed at a distal end of one side of the first mirror mount body part 111a in the width direction, and has the first mirror 211 disposed thereon. In this case, the first mirror 211 is formed in a form in which it protrudes to one side in the width direction. As an embodiment, the first mirror 211 may be formed in triangular prismatic shape in which it is extended in the width direction, as illustrated in FIG. 3, in order to lower a height using a small mirror. The first mirror mount mirror support part 111b has an attachment surface formed flatly in the width direction as illustrated in FIG. 5 so as to support the first mirror 211, and a bottom surface of the first mirror 211 is attached onto the attachment surface.

The first mirror mount fixing coupling hole 111c is formed in a through-hole form at a central portion of the first mirror mount body part 111a. Several through-holes are formed at appropriate positions predetermined in a design step on the measuring part 110 in order to be coupled to several mounts, as illustrated in FIG. 4. In this case, one 110a of the through-holes formed on the measuring part 110 and the first mirror mount fixing coupling hole 111c are disposed to be in communication with each other, a spring member penetrating through the through-hole formed on the measuring part 110 and the first mirror mount fixing coupling hole 111c is inserted into the through-hole and the first mirror mount fixing coupling hole 111c to couple the first mirror mount 111 and the measuring part 110 to each other. Here, the reason why the spring member is inserted instead of a screw member, a rod member, or the like, formed of a rigid body is as follows. A means that may adjust a twist angle of the first mirror mount body part 111a is separately provided, and the spring member is inserted and fixed into the first mirror mount fixing coupling hole 111c in order to permit slight movement in coupling using the first mirror mount fixing coupling hole 111c. Here, the means that may adjust the twist angle is implemented by the following first mirror mount angle adjusting screw holes 111d.

The first mirror mount angle adjusting screw holes 111d are formed in an internal thread form at corner portions of the first mirror mount body part 111a, and one pair of first mirror mount angle adjusting screw holes 111d are disposed on a diagonal as illustrated. Screw members are inserted into the first mirror mount angle adjusting screw holes 111d to thereby be coupled to the measuring part 110. In this case, an angle of the first mirror mount body part 111a with respect to the measuring part 110 may be adjusted depending on a level in which the screw members protrude outwardly of the first mirror mount body part 111a. This will be described in more detail in connection with the first mirror mount bead groove 111e.

The first mirror mount bead groove 111e is formed in a groove form by drilling a surface of the first mirror mount body part 111a contacting the measuring part 110 using a drill so as not to penetrate through the first mirror mount body part 111a, as illustrated. In addition, the first mirror mount bead groove 111e is formed at a point at which two extended lines extended from the centers of the first mirror mount angle adjusting screw holes 111d toward the first mirror 211 in parallel with outlines of the first mirror mount body part 111a meet each other, as illustrated. A bead is inserted into the first mirror mount bead groove 111e, and a distance between the first mirror mount body part 111a and the measuring part 110 is constantly maintained by protrusion of the bead at a position of the first mirror mount bead groove 111e through the configuration as described above. In this case, it is appropriate that the bead has a diameter of about 1 to 2 mm.

As described above, the one pair of first mirror mount angle adjusting screw holes 111d are formed on the first mirror mount body part 111a so as to be disposed on the diagonal. In this case, the first mirror mount body part 111a is coupled to the measuring part 110 by the coupling using the first mirror mount fixing coupling hole 111c, but is in a state in which it is spaced apart from the measuring part 110 by the bead inserted into the first mirror mount bead groove 111e. In this state, one pair of screw members are inserted and coupled into the one pair of first mirror mount angle adjusting screw holes 111d, respectively, and an angle of the first mirror mount body part 111a with respect to the measuring part 110 may be adjusted depending on an insertion level of the one pair of screw members. That is, two screw members may protrude in the same level, or one of the two screw members may further protrude as compared with the other of the two screw members. An angle between a plane formed by the first mirror mount body part 111a and a plane formed by the measuring part 110 may be appropriately adjusted through the process described above, resulting in adjusting a disposition angle of the first mirror 211. In summary, the protrusion levels of the screw members inserted into the one pair of first mirror mount angle adjusting screw holes 111d are adjusted to adjust the angle between the first mirror mount body part 111a and the measuring part 110, thereby making it possible to allow a laser to be accurately directed toward the tip.

Since the second mirror mount 112 has a form substantially similar to that of the first mirror mount 111 as illustrated in FIG. 3 and a coupled relationship between the second mirror mount 112 and the measuring part 110 is the same as that between the first mirror mount 111 and the measuring part 110, a separate illustration and description therefor will be omitted.

Figure 6:
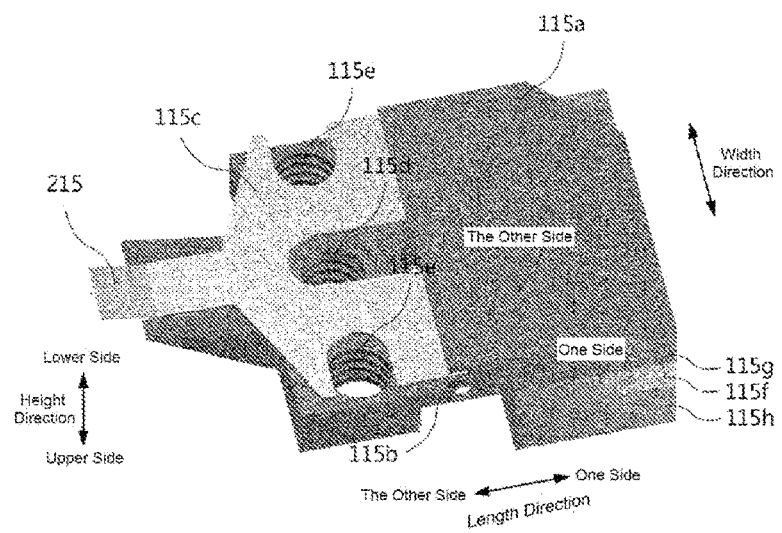
FIG. 6 is a view illustrating an embodiment of a tip mount according to the present invention.

FIG. 6 illustrates an embodiment of a tip mount according to the present invention. As illustrated in FIG. 6, the tip mount 115 is configured to include a tip mount body part 115a, a tip mount guide groove 115b, a tip mount press plate 115c, a tip mount fixing coupling hole 115d, tip mount guide coupling holes 115e, a PZT 115f provided on an upper surface of one side of the tip mount body part 115a in the length direction and vibrating the tip, a lower insulator plate 115g stacked on a lower surface of the PZT 115f, and an upper insulator plate 115h stacked on an upper surface of the PZT 115f.

The tip mount body part 115a is formed in a plate form as illustrated in FIG. 5, and is fixed and coupled to a lower surface of the measuring part 110 by a PZT laminate formed by stacking the upper insulator plate 115h, the PZT 115f, and the lower insulator plate 115g so as to apply vibration to the tip 215 (that is, the upper insulator plate 115h actually surface-contacts the lower surface of the measuring part 110). As intuitively seen in the description of the optical path mentioning that the light moves in a sequence of the reflection surface of the first mirror 211, the upper surface of the tip 215, and the reflection surface of the second mirror 212, the tip mount 115 should be provided below the mirror mounts 111 and 112. That is, as opposed to the mirror mounts 111 and 112 surface-contacting and coupled to the upper surface of the measuring part 110, the tip mount 115 surface-contacts and is coupled to the lower surface of the measuring part 110. The tip mount 115 and the measuring part 110 may be coupled to each other in any form such as a bolting form, a welding form, or the like, as long as they are stably fixed and coupled to each other. Meanwhile, one side of a lower surface of the tip mount body part 115a in the length direction protrudes, such that a step part is formed in the tip mount body part 115, and a tip mount press plate 115c to be described below is coupled to the step part.

The tip mount guide groove 115b is to guide regular positions of the tip mount body part 115a and the tip mount press plate 115c. The tip mount guide groove 115b is formed in a groove form in which it is extended in the width direction as illustrated in FIG. 6, on the step part of the tip mount body part 115a protruding on the lower surface of the tip mount body part 115a.

The tip mount press plate 115c is formed in a thin plate form having a spring feature, and a distal end of one side of the tip mount press plate 115c in the length direction is inserted and disposed into the tip mount guide groove 115b. Although a case in which the tip mount press plate 115c is fitted into the tip mount guide groove 115b does not form complete fixed coupling, it serves to stably guide and dispose the tip mount press plate 115c to and at a position at which the tip mount press plate 115c is easily assembled when complete fixed coupling is formed by screw members to be described below, and serves to allow the tip mount press plate 115c and the tip 215 to sufficiently surface-contact each other by pressing and fixing the tip 215 at appropriate force when the tip mount press plate 115c is fixed to the tip mount body part 115a by a screw of the tip mount fixing coupling hole 115d. That is, in summary, the tip mount press plate 115c is a component actually contacting the tip 215 to press and fix the tip. In more detail, the tip 215 is interposed between the tip mount body part 115a and the tip mount press plate 115c at a distal end of the other side of the tip mount 115 in the length direction, as illustrated in FIG. 6, and is pressed by the tip mount press plate 115c to thereby be supported by and fixed to the tip mount body part 115a. In this case, in order to remove an unnecessary weight and volume, it is more preferable that the tip mount body part 115a at a position at which the tip 215 is put is cut depending on a shape of the tip at the other side of the tip mount body part 115a in the length direction, and the tip 215 is put at the cut portion and is then pressed and fixed by the tip mount press plate 115c.

Meanwhile, since the tip mount body part 115a itself is stably fixed and coupled to the measuring part 110 as described above, it is sufficient to couple the tip mount body part 115a, the tip 215, and the tip mount press plate 115c to one another at stable regular positions. To this end, grooves are formed at positions corresponding to the tip mount fixing coupling hole 115d and the tip mount guide coupling holes 115e on the tip mount press plate 115c.

The tip mount fixing coupling hole 115d is formed in an internal thread form at a central portion of the tip mount body part 115a as illustrated. In this case, one of the grooves formed on the tip mount press plate 115c and the tip mount fixing coupling hole 115d are disposed to be in communication with each other, and a screw member penetrating through the groove formed on the tip mount press plate 115c and the tip mount fixing coupling hole 115d is inserted into the groove and the tip mount fixing coupling hole 115d to couple the tip mount body part 115a and the tip mount press plate 115c to each other.

The tip mount guide coupling holes 115e are formed in an internal thread form on the tip mount body part 115a, and one pair of tip mount guide coupling holes 115e are disposed at both sides of the tip mount fixing coupling hole 115d in the width direction so as to be spaced apart from each other, as illustrated. Similar to a coupled structure in the tip mount fixing coupling hole 115d, the other grooves formed on the tip mount press plate 115c and the tip mount guide coupling holes 115e are disposed to be in communication with each other, and screw members penetrating through the grooves formed on the tip mount press plate 115c and the tip mount guide coupling holes 115e are inserted into the grooves and the tip mount guide coupling holes 115e. In this case, a regular position of the tip mount press plate 115c in the width direction may be fixed by the coupling of one pair of screw members. That is, the tip mount guide coupling holes 115e hold both sides of the tip mount press plate 115c in the width direction, thereby making it possible to prevent the tip mount press plate 115c from being dislocated to both sides and deviated from the regular position.

Figure 7:
FIG. 7 is a photograph of an embodiment of an integrated-head for an AFM according to the present invention.

FIG. 7 is a photograph of an embodiment of an actually manufactured integrated-head for an AFM according to the present invention. In actually manufacturing the integrated-head 100 according to the present invention having the configuration as described above, shapes of the measuring part 110, the source part 120, and the sensing part 130 were formed in an integrated body by cutting an aluminum block. In an embodiment of manufacturing the integrated-head 100, the integrated-head 100 has been miniaturized to have a height of 15 mm, a width of 22 mm, and a length of 103 mm, and has become light to have a weight of about 50 g. (The present invention is not limited to the above-mentioned specifications, and the respective numerical values may be further decreased.)

Characteristics of the integrated-head 100 for an AFM according to the present invention will be described in more detail on the basis of an embodiment of FIG. 7. First, in the integrated-head 100 according to the present invention, the head frame is manufactured by a process of cutting portions except for a portion configuring a framework of the head frame and portions on which the first mirror mount 111, the second mirror mount 112, the tip mount 115, the light source part 220, and the PSPD 230 are mounted in an integrated block formed of a metal (for example, a light metal such as aluminum, or the like) having a density in a range of 2 to 5 g/cm$^3$, and the integrated block is additionally cut so that the head frame functions as portions of mounts of components of the head, thereby minimizing a volume and a weight. That is, the head frame is formed of the integrated body, thereby making it possible to minimize mechanical vibration, and all of unnecessary portions are cut and the head frame functions as portions of the mounts, thereby making it possible to minimize the weight and the volume. When viewing drawings (FIGS. 3 and 4) provided as an embodiment, the head frame functions as portions of the two mirror mounts and a mount of the light source part.

In addition, in the present invention, in the integrated-head 100 for an AMF, sizes of the respective mounted components may also be minimized. As a detailed example, the first mirror 211 and the second mirror 211 may be formed at a thickness that is in a range of 2 to 3 mm, and the first mirror mount 111, the second mirror mount 112, and the tip mount 115 may be formed at a thickness that is in a range of 0.5 to 1.5 mm.

In addition, the integrated-head 100 for an AMF is formed in a form in which it is extended to be elongated in only the length direction rather than other directions, thereby making it possible to mount the respective components in an optimized form. In detail, it is preferable that a ratio between a size of the integrated-head 100 in the width direction or the height direction and a size thereof in the length direction is in a range of 1:5 to 1:15 and the integrated-head 100 is formed to be elongated in only the length direction and is formed to be as short as possible in the width and height directions.

In addition, since the present invention is ultimately to manufacture the composite microscope including the integrated-head 100, in order to minimize a height of the integrated-head 100 for an AFM at a position of the probe of the tip 215 to minimize the working distance of the auxiliary microscope provided above the integrated-head 100 for an AFM, the optical path P is formed so that an incident angle of the light from the source part 120 to the measuring part 110 and a reflection angle of the light from the measuring part 110 to the sensing part 130 are acute angles as described above or the first mirror 211 and the second mirror 211 may be formed at the thickness that is in the range of 2 to 3 mm, and the first mirror mount 111, the second mirror mount 112, and the tip mount 115 may be formed at the thickness that is in the range of 0.5 to 1.5 mm.

In the case of the AFM according to the related art, the respective components for observation are formed of separate assemblies and are fixedly provided, such that weights and volumes of the respective components are significant large, and it is difficult to design a structure moving the respective components. However, in the present invention, the integrated-head is configured in a form in which only components necessarily required among the components for observation as described above are collected to be miniaturized, become light, and be modularized, thereby making it very easy to perform observation while moving the integrated-head itself. Particularly, due to the characteristics of the integrated-head according to the present invention that is miniaturized, becomes light, and is integrated as described above, dynamic characteristics become excellent at the time of driving a driving part so as to move the integrated-head itself. Therefore, there is no limitation in adopting the driving part moving the integrated-head, such that compatibility may be high and high-rate scan may be performed.

Figure 8:
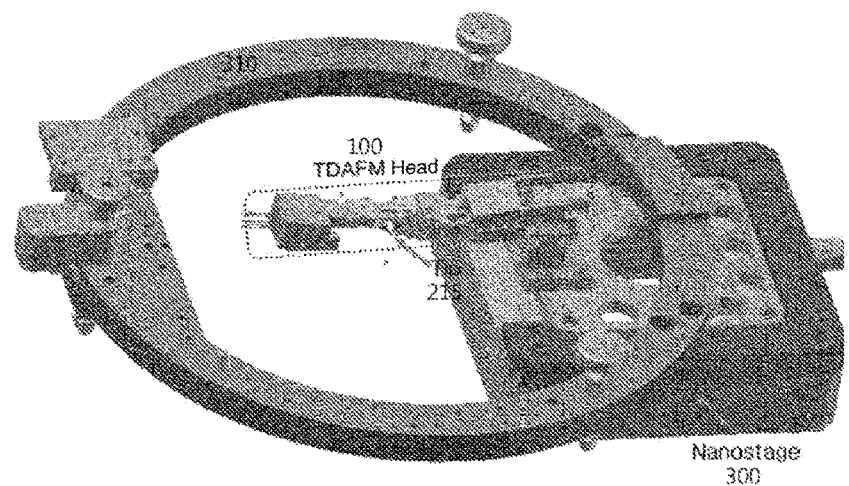
FIG. 8 is a view illustrating an embodiment of a ring fixing part to which a head of a head-integrated atomic force microscope according to the present invention and a nanostage scanning the head are fixed.
Figures 9, 10:
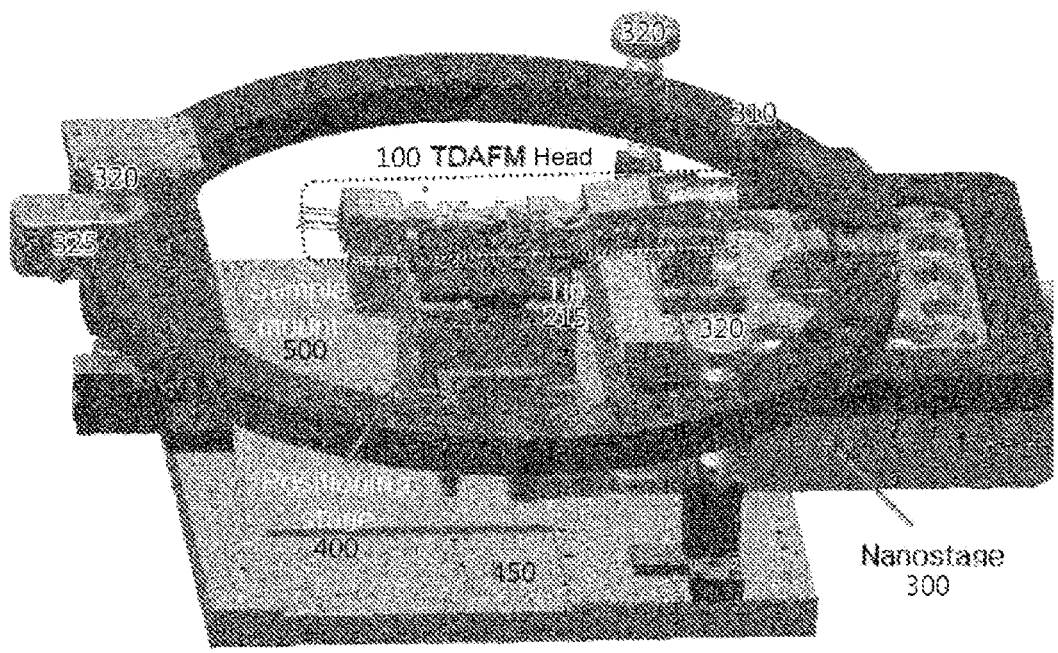
FIG. 9 is a view illustrating an embodiment of the head-integrated atomic force microscope according to the present invention.
FIG. 10 is a photograph of an embodiment of an AFM-scanning electron microscope (SEM) composite microscope in which the head-integrated atomic force microscope according to the present in is mounted on an SEM chamber.

FIGS. 8 and 9 illustrate an embodiment of a head-integrated atomic force microscope according to the present invention, wherein FIG. 8 illustrates some of the most basic components including the integrated-head 100 and FIG. 9 illustrates an embodiment in which the head-integrated atomic force microscope further includes additional components. Basically, the head-integrated atomic force microscope according to the present invention is configured to include the integrated-head 100 for an AFM having the configuration as described above, is fixed by a sample mount 500, and is formed to observe a surface of an observation target object disposed below the integrated-head 100. In addition, the head-integrated atomic force microscope may be configured to further include a scanning means 300, a positioning stage 400, and a ring fixing part 310.

Meanwhile, as described above, the integrated-head according to the present invention is developed in order to ultimately implement AFM, and FIG. 10 illustrates a photograph of an embodiment of a composite microscope including the head-integrated atomic force microscope according to the present invention, that is, an embodiment in which the AFM including the integrated-head configured as described above is installed on an SEM chamber As described above, when the SEM, which is an auxiliary microscope part, is further provided above the AFM configured as described above, an AFM-SEM composite microscope that may measure a large-area observation target object may be realized.

That is, the head-integrated atomic force microscope may be implemented by adopting the integrated-head according to the present invention, and when only the auxiliary microscope part is further provided, the composite microscope including the head-integrated atomic force microscope may be implemented. The auxiliary microscope part may be formed in a form of a charged particle microscope such as an SEM, an ion microscope, or the like, or be formed in a form of an optical microscope or another microscope, and an observation portion at which the probe in the integrated-head 100 is positioned is perforated as an empty space at upper and lower portions or a side portion, such that required components may be disposed and configured in an appropriate form above the integrated-head 100. Since the tip 215 of the integrated-head 100 is disposed below the auxiliary microscope part, an observation image of a surface of the observation target object including the tip 215 may be substantially obtained by the auxiliary microscope part.

In this case, a configuration of a general SEM or an optical microscope may be adopted as a configuration of the auxiliary microscope part. In other words, components having the same configuration as that of components for observation of the general SEM, the optical microscope, or the like, may be formed above the integrated-head 100. According to this technical purpose, a configuration of the SEM or the optical microscope configuring the auxiliary microscope part is not particularly limited, but may be a configuration of the SEM or the optical microscope generally known, and thus, a detailed description therefor will be omitted. Particularly, a distance from the tip 215 to an upper portion of the measuring part 110 above the tip is very small (6 mm), such that a working distance of the SEM or the optical microscope, which is an auxiliary microscope 600, may be decreased to 6 mm, and thus, high-resolution imaging is possible. Since both of portions above the two mirrors 211 and 222 and opposite portions of the mirror mounts 111 and 112 are empty, when the integrated-head 100 is pivoted around the length direction of the integrated-head, the working distance of the auxiliary microscope positioned above the integrated-head is not significantly increased, such that a high resolution of the auxiliary microscope may be maintained when the integrated-head 100 for an AFM is pivoted. When the integrated-head 100 is pivoted as described above, a tip of the probe that is hidden and is not viewed by a body of a cantilever or the probe and contacts the sample may be observed by the auxiliary microscope, such that a measurement position may be accurately selected.

That is, in the composite microscope, after the large-area observation target object is fixed and disposed on the sample mount 500, the large-area observation target object may be observed in real time by the auxiliary microscope part while being moved in a large range using the positioning stage 400. When the large-area observation target object arrives at a position of a desired region of interest while being moved as described above, movement of the positioning stage 400 is stopped, and the scanning means 300 is driven, thereby making it possible to perform observation in an atomic image level in the region of interest while moving the integrated-head 100 in a fine range. In other words, when the composite microscope according to the present invention is used, both of high-rate scan of the large-area observation target object and precise observation in the atomic image level in the desired region of interest may be accomplished. The scanning means 300 such as a nonostage is installed above the positioning stage 400 as in an existing another AFM, such that a small sample may be scanned by the nanostage. In this case, the integrated-head 100 is directly fixed to a fixing part such as the ring fixing part 310, or the like.

The remaining respective components of the atomic force microscope or the composite microscope according to the present invention except for the integrated-head 100 will be described below.

The scanning means 300, which serves to scan the integrated-head 100 or the sample mount 500 in X, Y, and Z directions, may be formed of a scanner for an AFM or be formed of a nanostage as illustrated in an embodiment of FIGS. 8 to 10. In the case, as the scanner for an AFM, all of various types of scanners for an AFM such as a single tube scanner or a plurality of tube scanners, a rod scanner, a stacked PZT scanner, or the like, may be used. Meanwhile, since various dynamic characteristics of the nanostage considering a resonant frequency, a movable range, a moving speed, and the like, of the nanostage itself are stably excellent, it is preferable to use the nanostage as the scanning means 300. As described above, the integrated-head 100 has a form in which it is miniaturized and becomes light, such that it is light and has excellent mechanical characteristics. Therefore, even though the integrated-head 100 is coupled to the scanning means 300, an influence of a decrease in a resonant frequency of the scanning means 300 is generated in an ignorable level. That is, even though the integrated-head 100 is moved by the scanning means 300, it is light and is integrated, such that the dynamic characteristics are excellent. Therefore, a negative influence is hardly generated in a measuring operation of the integrated-head 100, a driving control of the scanning means 300, or the like, such that the measuring operation and the driving control may be performed as desired.

In addition, the atomic force microscope or the composite microscope may be configured to further include the ring fixing part 310 formed in a ring shape and connecting and fixing a target object including the integrated-head 100 to one side thereof; and three pillar parts 320 radially disposed on a circumference of the ring fixing part 310 and fixing the ring fixing part 310 in a state in which they space the ring fixing part 310 apart from a substrate part 450, in order to stably support the integrated-head 100, or the like. In this case, it is preferable that the scanning means 300 scanning the integrated-head 100 is fixed to an intermediate position of two of the pillar parts 320. The ring fixing part 310 is supported by three fixing points through the configuration described above, such that it may be most stably fixed in a horizontal direction. In addition, the scanning means 300 is fixed to an intermediate position of two fixing points selected among the three fixing points to thereby be balanced. Therefore, ultimately, the scanning means 300 is connected to the substrate part 450, such that it may be stably fixed in the horizontal direction. In addition, an ascending or descending means 325 is further provided in at least any one selected among the pillar parts 320, thereby making it possible to allow the probe of the tip 215 to approach the surface of the observation target object or be spaced apart from the surface of the observation target object up to a distance at which the probe may be fed back.

The positioning stage 400 moves the integrated-head 100 or the sample mount 500 in the X, Y, and Z directions, and is formed to move the integrated-head 100 or the sample mount 500 in a scale relatively larger as compared with the scanning means 300. That is, the integrated-head 100 or the sample mount 500 is moved in a large scale by the positioning stage 400, thereby making it possible to rapidly find a desired position on the large-area observation target object.

FIGS. 11 to 14 illustrate experiment results obtained by actually performing observation using the composite microscope according to the present invention manufactured as described above.

FIG. 11 illustrates a result obtained by observing a gold nanoprism by the composite microscope as described above. In FIG. 11A, which is an SEM image, a probe of a tip for an AFM used for observation appears in a clear triangular shape in a lower portion of the left of a screen, together with a structure of the gold nanoprism. That is, FIG. 11A shows that the probe may be precisely positioned on a desired specific position on a specific nanostructure. FIG. 11B illustrates a three-dimensional AFM image, FIG. 11C illustrates a two-dimensional AFM image, and FIG. 11D illustrates a shape of a tip for an AFM that is used (SEM observation).

FIG. 12 illustrates that accurate three-dimensional information may be obtained using the AFM of the composite microscope. FIG. 12A illustrates the same AFM two-dimensional image as that of FIG. 11C, and FIG. 12B illustrates heights of each position through which a line of a lower portion of the image of FIG. 12A passes, and it may be seen that three-dimensional information such as thickness, or the like, in a region of interest may be accurately measured.

FIG. 13 illustrates a difference between results obtained by observing the same position of the same sample by the SEM and the AFM. FIG. 13A is an SEM image, FIG. 13B is an AFM image, and portions denoted by arrows indicate the same positions in each of FIGS. 13A and 13B. The SEM image and the AFM image provide different kinds of information. In detail, a contrast of the SEM is in proportion to an amount of secondary electrons formed by an electron beam entering a sample and detected in a detector, while the AFM provides height information. It may be seen from FIG. 13 that a dim structure positioned at an upper portion of the left of FIG. 13A, which is the SEM image, appears as a very high structure having a height of 1 μm in FIG. 13B, which is the AFM image. It may be certainly seen that it is insufficient to obtain three-dimensional information by the SEM image, while accurate three-dimensional information may be obtained when observation is performed by the AFM. That is, it may be confirmed that the accurate three-dimensional information in the desired region of interest may be obtained through an AFM-SEM composite microscope technology according to the present invention.

FIG. 14 illustrates results obtained by observing a salt crystal portion appearing in the AFM image of FIG. 13B while changing a head scan rate. FIG. 14A illustrates a result obtaining by imaging a gold nanoprism observation target object having a 7 μm×7 μm area at a line scan rate of 1 Hz, and FIG. 14B illustrates a result obtaining by imaging the gold nanoprism observation target object having a 7 μm×7 μm area at a line scan rate of 1.8 Hz. When comparing FIGS. 14A and 14B with each other, it was confirmed that even though the scan rate becomes faster by 80%, a good image is continuously obtained without a change in a disposition and a shape of the entire nanoprism. The line scan rate of 1.8H is a high rate that it is difficult to use even in a general AFM scanning a small sample, and it was confirmed that a gold nanoprism sample having a wide area of 7 μm×7 μm and a height of several hundreds of nanometers may be head-scanned at a high rate to be clearly imaged even in this high rate imaging. When noise of an AFM signal is measured while raising a scan rate in a state in which the tip and the sample are spaced apart from each other without performing imaging at the time of an actual experiment, it may be seen that as the scan rate is raised, the noise is gradually increased, and resonance is generated at a line scan rate of 30 Hz. Therefore, a flat sample of which a height of a surface is small may be measured at a line scan rate close to 30 Hz. In this case, it may be seen that a time required for obtaining one image is only 10 seconds. This imaging rate is significantly faster than a general sample scan imaging rate (a line scan rate of generally about 0.5 Hz). That is, it may be confirmed that much faster, more accurate, and more precise observation results may be obtained in the case of using the composite microscope according to the present invention than in the case of using a general AFM and since the composite microscope according to the present invention uses a head scan scheme, the composite microscope according to the present invention may be applied to a large-area sample such as a wafer.

The present invention is not limited to the above-mentioned exemplary embodiments, but may be variously applied. In addition, the present invention may be variously modified by those skilled in the art to which the present invention pertains without departing from the gist of the present invention claimed in the claims.

INDUSTRIAL APPLICABILITY

According to the present invention, a head for an AFM of which a weight and a volume are significantly decreased and structural stability is improved as compared with an existing AFM may be realized.

In addition, according to the present invention, the structural stability of the head itself for an AFM is secured as described above, such that dynamic characteristics of an atomic force microscope in which the integrated-head for an AFM described above is mounted are significantly improved.

Due to the effects described above, according to the present invention, a composite effect of the head-integrated atomic force microscope of which the dynamic characteristics are improved as described and a charged particle microscope such as an electron microscope or an optical microscope may be maximized.

The invention claimed is:

1. An integrated-head for an atomic force microscope, comprising:
a measuring part 110 formed in a plate form in which it is extended from one side to the other side in a length direction, having a first mirror mount 111 and a second mirror mount 112 sequentially disposed therein to be spaced apart from each other from one side to the other side in the length direction and fixed thereto, having a tip mount 115 disposed therein to be spaced apart from the first mirror mount 111 in height and width directions and fixed thereto, and having an empty space formed below a tip 215, the first mirror mount 111 being provided with a first mirror 211, the second mirror mount 112 being provided with a second mirror 212, and the tip mount 115 being provided with the tip 215 including a probe disposed on a lower surface thereof and formed in a plate form in which it is extended in the length direction;
a source part 120 formed in a block form in which it is connected to one side of the measuring part 110, having a penetrating path 125 formed in the length direction therein, and having a light source part 220 provided at a distal end of one side of the penetrating path 125 and fixed thereto; and
a sensing part 130 formed in a block form in which it is connected to the other side of the measuring part 110, having an accommodating path 135 formed in the length direction therein, and having a position-sensitive photo detector (PSPD) 230 accommodated on the accommodating path 135 and fixed thereto,
wherein the measuring part 110, the source part 120, and the sensing part 130 form a head frame formed of an integrated body, and
wherein the head frame is manufactured by a process of cutting all portions except for portions supporting and fixing a framework having a thickness and a width required for preventing mechanical vibration and head components including the first mirror mount 111, the second mirror mount 112, the tip mount 115, the light source part 220, and the PSPD 230 in a single block formed of a metal having a density in a range of 2 to 5 g/cm3 and additionally cutting the single block so that the head frame itself functions as portions of the mounts of the head components in order to decrease a weight and a volume.

2. The integrated-head for an atomic force microscope of claim 1, wherein an optical path is formed so that light passing through the penetrating path 125 from the light source part 220 is incident to the first mirror 211, light reflected on the first mirror 211 is incident to an upper surface of the tip 215, light reflected on the upper surface of the tip 215 is incident to the second mirror 212, and light reflected on the second mirror 212 is incident to and sensed in the PSPD 230.

3. The integrated-head for an atomic force microscope of claim 2, wherein the first mirror 211 and the second mirror 212 are provided in a form in which they protrude in the width direction with respect to the first mirror mount 111 and the second mirror mount 112, respectively, and the respective reflection surfaces of the first mirror 211 and the second mirror 212 are disposed to be directed toward the bottom of the integrated-head, the penetrating path 125 and the accommodating path 135 are formed to be inclined toward the measuring part 110 with respect to surfaces formed by the measuring part 110, respectively, and the reflection surface of the first mirror 211 is disposed to be inclined toward the penetrating path 125 and the reflection surface of the second mirror 212 is disposed to be inclined toward the accommodating path 135.

4. The integrated-head for an atomic force microscope of claim 1, wherein the first mirror mount 111 includes:

a first mirror mount body part 111a formed in a plate form and disposed to surface-contact an upper surface of the measuring part 110;

a first mirror mount mirror support part 111b formed at a distal end of one side of the first mirror mount body part 111a in the width direction and having the first mirror 211 disposed thereon;

a first mirror mount fixing coupling hole 111c formed in a through-hole form at a central portion of the first mirror mount body part 111a;

one pair of first mirror mount angle adjusting screw holes 111d formed in an internal thread form at corner portions of the first mirror mount body part 111a and disposed on a diagonal; and a first mirror mount bead groove 111e formed by drilling a surface of the first mirror mount body part 111a contacting the measuring part 110 using a drill so as not to penetrate through the first mirror mount body part 111a and formed at a point at which two extended lines extended from centers of the first mirror mount angle adjusting screw holes 111d toward the first mirror 211 in parallel with outlines of the first mirror mount body part 111a meet each other, one 110a of through-holes formed on the measuring part 110 and the first mirror mount fixing coupling hole 111c are disposed to be in communication with each other, and a spring member penetrating through the through-hole 110a formed on the measuring part 110 and the first mirror mount fixing coupling hole 111c is inserted into the through-hole 110a and the first mirror mount fixing coupling hole 111c to couple the first mirror mount 111 and the measuring part 110 to each other, a bead is inserted into the first mirror mount bead groove 111e, such that a distance between the first mirror mount body part 111a and the measuring part 110 is constantly maintained by protrusion of the bead at a position of the first mirror mount bead groove 111e, and one pair of screw members are inserted into the one pair of first mirror mount angle adjusting adjust holes 111d, respectively, and an angle of the first mirror mount body part 111a with respect to the measuring part 110 is adjusted depending on an insertion level of the one pair of screw members.

5. The integrated-head for an atomic force microscope of claim 1, wherein the second mirror mount 112 includes:

a second mirror mount body part 112a formed in a plate form and disposed to surface-contact an upper surface of the measuring part 110;

a second mirror mount mirror support part 112b formed at a distal end of one side of the second mirror mount body part 112a in the width direction and having the second mirror 212 disposed thereon;

a second mirror mount fixing coupling hole 112c formed in a through-hole form at a central portion of the second mirror mount body part 112a;

one pair of second mirror mount angle adjusting screw holes 112d formed in an internal thread form at corner portions of the second mirror mount body part 112a and disposed on a diagonal; and a second mirror mount bead groove 112e formed by drilling a surface of the second mirror mount body part 112a contacting the measuring part 110 using a drill so as not to penetrate through the second mirror mount body part 112a and formed at a point at which two extended lines extended from centers of the second mirror mount angle adjusting screw holes 112d toward the second mirror 212 in parallel with outlines of the second mirror mount body part 112a meet each other, one 110b of through-holes formed on the measuring part 110 and the second mirror mount fixing coupling hole 112c are disposed to be in communication with each other, and a spring member penetrating through the through-hole 110b formed on the measuring part 110 and the second mirror mount fixing coupling hole 112c is inserted into the through-hole 110b and the second mirror mount fixing coupling hole 112c to couple the second mirror mount 112 and the measuring part 110 to each other, a bead is inserted into the second mirror mount bead groove 112e, such that a distance between the second mirror mount body part 112a and the measuring part 110 is constantly maintained by protrusion of the bead at a position of the second mirror mount bead groove 112e, and one pair of screw members are inserted into the one pair of second mirror mount angle adjusting screw holes 112d, respectively, and an angle of the second mirror mount body part 112a with respect to the measuring part 110 is adjusted depending on an insertion level of the one pair of screw members.

6. The integrated-head for an atomic force microscope of claim 1, wherein the tip mount 115 includes:

a tip mount body part 115a formed in a plate form, fixed and coupled to a lower surface of the measuring part 110 so as to surface-contact the lower surface of the measuring part 110, and having a step part formed by protruding one side of a lower surface thereof in the length direction; a tip mount guide groove 115b formed on the step part of the tip mount body part 115a so as to be extended in the width direction; a tip mount press plate 115c formed in a thin plate form, a distal end of one side thereof in the length direction being inserted and disposed into the tip mount guide groove 115b; a tip mount fixing coupling hole 115d formed in an internal thread form at a central portion of the tip mount body part 115a; one pair of tip mount guide coupling holes 115e formed in a through-hole form at both sides of the tip mount fixing coupling hole 115d in the width direction on the tip mount body part 115a so as to be spaced apart from each other; a PZT 115f provided on an upper surface of one side of the tip mount body part 115a in the length direction and vibrating the tip; a lower insulator plate 115g stacked on a lower surface of the PZT 115f; and an upper insulator plate 115h stacked on an upper surface of the PZT 115f, the tip 215 is interposed between the tip mount body part 115a and the tip mount press plate 115c at a distal end of the other side of the tip mount 115 in the length direction and is pressed by the tip mount press plate 115c to thereby be supported by and fixed to the tip mount body part 115a, the tip mount 115 is fixed and coupled to the lower surface of the measuring part 110 by a PZT laminate formed by stacking the upper insulator plate 115h, the PZT 115f, and the lower insulator plate 115g, grooves are formed at positions corresponding to the tip mount fixing coupling hole 115d and the tip mount guide coupling holes 115e on the tip mount press plate 115c, one of the grooves formed on the tip mount press plate 115c and the tip mount fixing coupling hole 115d are disposed to be in communication with each other, and a screw member penetrating through the groove formed on the tip mount press plate 115c and the tip mount fixing coupling hole 115d is inserted into the groove and the tip mount fixing coupling hole 115d to couple the tip mount body part 115a and the tip mount press plate 115c to each other, and the other grooves formed on the tip mount press plate 115c and the tip mount guide coupling holes 115e are disposed to be in communication with each other, screw members penetrating through the grooves formed on the tip mount press plate 115c and the tip mount guide coupling holes 115e are inserted into the grooves and the tip mount guide coupling holes 115e, and a regular position of the tip mount press plate 115c in the width direction is fixed by coupling of one pair of screw members.

7. The integrated-head for an atomic force microscope of claim 1, wherein the first mirror 211 and the second mirror 211 are formed at a thickness that is in a range of 2 to 3 mm, and the first mirror mount 111, the second mirror mount 112, and the tip mount 115 are formed at a thickness that is in a range of 0.5 to 1.5 mm.

8. The integrated-head for an atomic force microscope of claim 1, wherein a ratio between a size of the integrated-head 100 for an atomic force microscope in the width direction or the height direction and a size thereof in the length direction is in a range of 1:5 to 1:15.

9. The integrated-head for an atomic force microscope of claim 1, wherein in order to minimize a height of the integrated-head 100 for an AFM at a position of the probe of the tip 215 to minimize a working distance of an auxiliary microscope provided above the integrated-head 100 for an atomic force microscope, an optical path P is formed so that an incident angle of light from the source part 120 to the measuring part 110 and a reflection angle of light from the measuring part 110 to the sensing part 130 are acute angles or the first mirror 211 and the second mirror 211 are formed at a thickness that is in a range of 2 to 3 mm, and the first mirror mount 111, the second mirror mount 112, and the tip mount 115 are formed at a thickness that is in a range of 0.5 to 1.5 mm.

10. The integrated-head for an atomic force microscope of claim 1, wherein both of portions above the first mirror 211 and the second mirror 222 and opposite portions of the first mirror mount 111 and the second mirror mount 112 are empty to prevent in an increase in a working distance of an auxiliary microscope positioned above the integrated-head in the case in which the integrated-head 100 is pivoted around the length direction.

11. The integrated-head for an atomic force microscope of claim 1, wherein in the source part 120, the light source part 220 is formed of a collimator collecting and irradiating light input from an external light source or a laser diode corresponding to a self light-emitting source, and a lens 225 is further provided on the penetrating path 125.

12. The integrated-head for an atomic force microscope of claim 1, wherein in the source part 120, the light source part 220 is formed of a laser fiber focuser configured to include an optical fiber receiving laser light, a holder holding a distal end of the optical fiber, a laser focusing lens focusing the light transmitted from the optical fiber, and a fixing mount fixing the optical fiber, and the holder, and the laser focusing lens integrally with each other.

13. A head-integrated atomic force microscope comprising the integrated-head 100 for an atomic force microscope of claim 1, wherein the head-integrated atomic force microscope is fixed by a sample mount 500 and observes a surface of an observation target object disposed below the integrated-head 100.

14. The head-integrated atomic force microscope of claim 13, further comprising a scanning means 300 scanning the integrated-head 100 or the sample mount 500 in X, Y, and Z directions, wherein the scanning means 300 is formed of a scanner for an atomic force microscope or a nanostage.

15. The head-integrated atomic force microscope of claim 14, further comprising a positioning stage 400 moving the integrated-head 100 or the sample mount 500 in the X, Y, and Z direction and formed to move the integrated-head 100 or the sample mount 500 in a scale relatively larger as compared with the scanning means 300.

16. The head-integrated atomic force microscope of claim 15, further comprising:

a ring fixing part 310 formed in a ring shape and connecting and fixing a target object including the integrated-head 100 to one side thereof; and three pillar parts 320 radially disposed on a circumference of the ring fixing part 310 and fixing the ring fixing part 310 in a state in which they space the ring fixing part 310 apart from a substrate part 450.

17. The head-integrated atomic force microscope of claim 16, wherein the scanning means 300 scanning the integrated-head 100 is fixed to an intermediate position of two of the pillar parts 320.

18. The head-integrated atomic force microscope of claim 17, further comprising an ascending or descending means 325 provided in at least any one selected among the pillar parts 320 so as to allow the probe of the tip 215 to approach the surface of the observation target object or be spaced apart from the surface of the observation target object up to a distance at which the probe is fed back.

19. A composite microscope including a head-integrated atomic force microscope, comprising:
the integrated-head 100 for an atomic force microscope of claim 1;
an auxiliary microscope part disposed above the integrated-head 100, fixed by a sample mount 500, and observing a surface of an observation target object disposed below the integrated-head 100;
a scanning means 300 scanning the integrated-head 100 or the sample mount 500 in X, Y, and Z directions, wherein the scanning means 300 is formed of a scanner for an atomic force microscope or a nanostage;
a ring fixing part 310 formed in a ring shape and connecting and fixing a target object including the integrated-head 100 to one side thereof; and
three pillar parts 320 radially disposed on a circumference of the ring fixing part 310 and fixing the ring fixing part 310 in a state in which they space the ring fixing part 310 apart from a substrate part 450.

20. The composite microscope including a head-integrated atomic force microscope of claim 19, wherein the auxiliary microscope part is formed in a form of a charged particle microscope including a scanning electron microscope (SEM) or an ion microscope or be formed in a form of an optical microscope.

21. The composite microscope including a head-integrated atomic force microscope of claim 19, further comprising a positioning stage 400 moving the integrated-head 100 or the sample mount 500 in the X, Y, and Z direction and formed to move the integrated-head 100 or the sample mount 500 in a scale relatively larger as compared with the scanning means 300.

22. The composite microscope including a head-integrated atomic force microscope of claim 19, wherein the scanning means 300 scanning the integrated-head 100 is fixed to an intermediate position of two of the pillar parts 320.

23. The composite microscope including a head-integrated atomic force microscope of claim 22, further comprising an ascending or descending means 325 provided in at least any one selected among the pillar parts 320 so as to allow the probe of the tip 215 to approach the surface of the observation target object or be spaced apart from the surface of the observation target object up to a distance at which the probe is fed back.

* * * * *